(12) United States Patent
Glanzer et al.

(10) Patent No.: US 7,167,762 B2
(45) Date of Patent: Jan. 23, 2007

(54) SYSTEM AND METHOD FOR IMPLEMENTING SAFETY INSTRUMENTED SYSTEMS IN A FIELDBUS ARCHITECTURE

(75) Inventors: David A. Glanzer, Georgetown, TX (US); Joseph D. Duffy, Georgetown, TX (US); Stephen B. Mitschke, Austin, TX (US); John Carl Gabler, Irvine, CA (US); L Jonas F. Berge, Singapore (SG); Ram Ramachandran, Austin, TX (US)

(73) Assignee: Fieldbus Foundation, Austin, TX (US)

( * ) Notice: Subject to any disclaimer, the term of this patent is extended or adjusted under 35 U.S.C. 154(b) by 0 days.

(21) Appl. No.: 11/240,939

(22) Filed: Sep. 30, 2005

(65) Prior Publication Data

US 2006/0025872 A1    Feb. 2, 2006

Related U.S. Application Data

(63) Continuation of application No. 10/826,576, filed on Apr. 16, 2004, now Pat. No. 6,999,824, and a continuation-in-part of application No. 10/453,596, filed on Jun. 4, 2003, now abandoned, which is a continuation-in-part of application No. 10/160,094, filed on Jun. 4, 2002, now Pat. No. 6,594,530, which is a continuation of application No. 08/916,178, filed on Aug. 21, 1997, now Pat. No. 6,424,872.

(60) Provisional application No. 60/463,334, filed on Apr. 17, 2003.

(51) Int. Cl.
*G05B 9/02* (2006.01)
*G05B 11/01* (2006.01)
*H04L 9/00* (2006.01)

(52) U.S. Cl. .................. 700/79; 700/18; 700/21; 700/86; 700/87; 702/122; 702/182; 702/183; 709/224; 709/227; 709/230; 709/201; 710/15; 710/72; 710/105; 713/170; 713/172; 713/176

(58) Field of Classification Search ............... 700/2–4, 700/7, 12–19, 24–37, 79, 83–87; 702/122, 702/182, 186; 709/223–227, 217, 245, 250, 709/201; 719/328, 329, 332; 710/21, 67–72, 710/75, 105, 109; 713/170, 172, 176
See application file for complete search history.

(56) References Cited

U.S. PATENT DOCUMENTS

RE27,703 E    7/1973   Stafford et al.

(Continued)

FOREIGN PATENT DOCUMENTS

WO     WO 97/29409      8/1997

(Continued)

OTHER PUBLICATIONS

Author Unknown, "OPC Task Force", pp. 1-27, Oct. 27, 1998.

(Continued)

*Primary Examiner*—Ramesh Patel
(74) *Attorney, Agent, or Firm*—Dorsey & Whitney LLP

(57) ABSTRACT

An apparatus, system and process is provided for communicating safety-related data, over an open system, from a sender to a receiver. Safety-related components, including function blocks, flexible function blocks, resource blocks and transducer blocks, as well as, safety-related objects are provided. Also, an extended safety-related protocol provides for authenticating communications between safety-related components over an existing black channel, such as one using a fieldbus Architecture.

20 Claims, 24 Drawing Sheets

U.S. PATENT DOCUMENTS

| | | | |
|---|---|---|---|
| 4,074,565 A * | 2/1978 | Harris et al. ................ | 73/778 |
| 4,099,242 A | 7/1978 | Houston et al. | |
| 4,283,634 A * | 8/1981 | Yannone et al. ........ | 290/40 R |
| 4,347,563 A * | 8/1982 | Paredes et al. ................ | 700/8 |
| 4,430,699 A | 2/1984 | Segarra et al. | |
| 4,484,273 A | 11/1984 | Stiffler et al. | |
| 4,531,193 A | 7/1985 | Yasuhara et al. | |
| 4,591,977 A | 5/1986 | Nissen et al. | |
| 4,819,149 A | 4/1989 | Sanik et al. | |
| 4,831,558 A | 5/1989 | Shoup et al. | |
| 4,864,489 A | 9/1989 | Yasuhara et al. | |
| 4,888,726 A * | 12/1989 | Struger et al. .............. | 709/201 |
| 4,938,068 A | 7/1990 | Clements | |
| 4,969,083 A | 11/1990 | Gates | |
| 4,992,926 A | 2/1991 | Janke et al. | |
| 5,115,675 A | 5/1992 | Feldman et al. | |
| 5,122,794 A | 6/1992 | Warrior | |
| 5,131,092 A | 7/1992 | Sackmann et al. | |
| 5,151,978 A | 9/1992 | Bronikowski et al. | |
| 5,159,673 A | 10/1992 | Sackmann et al. | |
| 5,166,678 A | 11/1992 | Warrior | |
| 5,245,704 A | 9/1993 | Weber et al. | |
| 5,251,302 A | 10/1993 | Weigl et al. | |
| 5,329,579 A | 7/1994 | Brunson | |
| 5,333,114 A | 7/1994 | Warrior et al. | |
| 5,434,774 A | 7/1995 | Seberger | |
| 5,448,231 A | 9/1995 | Takezoe et al. | |
| 5,451,923 A | 9/1995 | Seberger et al. | |
| 5,452,201 A | 9/1995 | Pieronek et al. | |
| 5,453,924 A | 9/1995 | Monson et al. | |
| 5,457,999 A | 10/1995 | Feldman | |
| 5,485,142 A | 1/1996 | Stute et al. | |
| 5,485,400 A | 1/1996 | Warrior et al. | |
| 5,506,956 A | 4/1996 | Cohen | |
| 5,513,324 A | 4/1996 | Dolin, Jr. et al. | |
| 5,526,358 A * | 6/1996 | Gregerson et al. .......... | 709/221 |
| 5,537,547 A | 7/1996 | Chan et al. | |
| 5,537,626 A | 7/1996 | Kraslavsky et al. | |
| 5,546,584 A | 8/1996 | Lundin et al. | |
| 5,553,297 A | 9/1996 | Yonezawa et al. | |
| 5,579,482 A | 11/1996 | Einkauf et al. | |
| 5,608,720 A | 3/1997 | Biegel et al. | |
| 5,682,476 A | 10/1997 | Tapperson et al. | |
| 5,684,451 A | 11/1997 | Seberger et al. | |
| 5,691,896 A | 11/1997 | Zou et al. | |
| 5,706,007 A | 1/1998 | Fragnito et al. | |
| 5,754,596 A | 5/1998 | Baschoff et al. | |
| 5,764,891 A | 6/1998 | Warrior | |
| 5,764,955 A | 6/1998 | Doolan | |
| 5,768,119 A | 6/1998 | Havekost et al. | |
| 5,793,963 A | 8/1998 | Tapperson et al. | |
| 5,796,602 A | 8/1998 | Wellan et al. | |
| 5,796,721 A | 8/1998 | Gretta, Jr. | |
| 5,801,942 A | 9/1998 | Nixon et al. | |
| 5,805,442 A | 9/1998 | Crater et al. | |
| 5,825,664 A | 10/1998 | Warrior et al. | |
| 5,828,851 A | 10/1998 | Nixon et al. | |
| 5,834,861 A | 11/1998 | Kanzaki et al. | |
| 5,838,563 A | 11/1998 | Dove et al. | |
| 5,841,654 A | 11/1998 | Verissimo et al. | |
| 5,850,523 A | 12/1998 | Gretta, Jr. | |
| 5,854,890 A * | 12/1998 | Ramachandran et al. ...... | 726/4 |
| 5,859,959 A | 1/1999 | Kimball et al. | |
| 5,862,052 A | 1/1999 | Nixon et al. | |
| 5,881,311 A | 3/1999 | Woods | |
| 5,889,817 A | 3/1999 | Yoshida | |
| 5,903,455 A | 5/1999 | Sharpe, Jr. et al. | |
| 5,909,368 A | 6/1999 | Nixon et al. | |
| RE36,263 E | 8/1999 | Janke et al. | |
| 5,960,214 A | 9/1999 | Sharpe, Jr. et al. | |
| 5,963,147 A | 10/1999 | Westfield et al. | |
| 5,970,430 A | 10/1999 | Burns et al. | |
| 5,971,581 A | 10/1999 | Gretta et al. | |
| 5,975,737 A | 11/1999 | Crater et al. | |
| 5,978,578 A | 11/1999 | Azarya et al. | |
| 5,978,850 A | 11/1999 | Ramachandran et al. | |
| 5,980,078 A | 11/1999 | Krivoshein et al. | |
| 5,982,362 A | 11/1999 | Crater et al. | |
| 5,995,916 A | 11/1999 | Nixon et al. | |
| 6,014,612 A | 1/2000 | Larson et al. | |
| 6,017,143 A | 1/2000 | Ervurek et al. | |
| 6,026,352 A | 2/2000 | Burns et al. | |
| 6,032,208 A | 2/2000 | Nixon et al. | |
| 6,044,305 A | 3/2000 | Larson et al. | |
| 6,047,220 A | 4/2000 | Eryurek | |
| 6,047,222 A | 4/2000 | Burns et al. | |
| 6,061,603 A | 5/2000 | Papadopoulos et al. | |
| 6,076,952 A | 6/2000 | Gretta et al. | |
| 6,078,320 A | 6/2000 | Dove et al. | |
| 6,094,600 A | 7/2000 | Sharpe, Jr. et al. | |
| 6,095,674 A | 8/2000 | Verissimo et al. | |
| 6,098,116 A | 8/2000 | Nixon et al. | |
| 6,102,965 A * | 8/2000 | Dye et al. ................... | 717/109 |
| 6,119,047 A | 9/2000 | Eryurek et al. | |
| 6,151,625 A | 11/2000 | Swales et al. | |
| 6,266,726 B1 * | 7/2001 | Nixon et al. ................. | 710/105 |
| 6,424,872 B1 * | 7/2002 | Glanzer et al. ............... | 700/18 |
| 6,446,202 B1 | 9/2002 | Krivoshein et al. | |
| 6,484,061 B2 | 11/2002 | Papadopoulos et al. | |
| 6,594,530 B1 * | 7/2003 | Glanzer et al. ............... | 700/18 |
| 6,826,590 B1 * | 11/2004 | Glanzer et al. ............. | 709/200 |
| 6,999,824 B2 * | 2/2006 | Glanzer et al. ............... | 700/18 |
| 2002/0112044 A1 | 8/2002 | Hessmer et al. | |
| 2003/0004987 A1 | 1/2003 | Glanzer et al. | |
| 2004/0194101 A1 * | 9/2004 | Glanzer et al. ............. | 718/100 |
| 2005/0021705 A1 | 1/2005 | Jurisch | |
| 2005/0240286 A1 | 10/2005 | Glanzer et al. | |
| 2005/0240287 A1 | 10/2005 | Glanzer et al. | |

FOREIGN PATENT DOCUMENTS

| | | |
|---|---|---|
| WO | WO98/02993 | 1/1998 |
| WO | WO99/48245 | 9/1999 |

OTHER PUBLICATIONS

Bangemann et al., "Integration of Fieldbus Systems in Computer-Aided Facility Management", IEEE, pp. 1835-1840, Aug. 31, 1998.

Berge et al., "Building Better Open Networks Using Foundation Fieldbus and OPC", Sensors, pp. 75-78, 81-82, Feb. 2000.

Berge, Jonas, "Plug-'n'-play control systems integrating FOUNDATION Fieldbus and OPC", publication unknown, pp. 123-131, 1999.

Neumann et al., "Integration of Fieldbus Systems into Distributed Object-Oriented Systems", IEEE, pp. 247-253, Oct. 1, 1997.

Arpaia et al., "A Distributed Laboratory Based on Object-Oriented Measurement Systems", Measurement, vol. 19, No. ¾, pp. 207-215, 1996.

Cheah et al., "Design and Implementation of an MMS Environment on Isode", Computer Communications, vol. 20, pp. 1354-1364, 1997.

Drakopoulos, Elias, "Enterprise Network Planning and Design: Methodology and Application", Computer Communications, vol. 22, pp. 340-352, 1999.

File History: Crater et al., "Distributed Interface Architecture for Programmable Industrial Control Systems", U.S. Patent No. 5,805,442, Issued Sep. 8, 1998, U.S. Appl. No. 08/655,469, filed May 30, 1996.

File History: Crater et al., "Distributed Interface Architecture for Programmable Industrial Control Systems", U.S. Patent No. 5,975,737, Issued Nov. 2, 1999, U.S. Appl. No. 09/112,583, filed Jul. 9, 1998.

File History: Janke et al., Peer-to-Peer Register Exchange Controller for Industrial Programmable Controllers, U.S. Patent No. 4,992,926, Issued Feb. 12, 1991, U.S. Appl. No. 07/258,779, filed Oct. 17, 1988.

International Search Report, Application No. PCT/US04/11616, Apr. 16, 2004.

He et al., "Clock Synchronization in Real-Time Distributed Systems Based on FIP Field Bus", Centre de Recherche en Informatique de Nancy, pp. 135-141, Sep. 30, 1990.

Lonn et al., "Synchronisation in Safety-Critical Distributed Control Systems", Chalmers University of Technology, Laboratory for Dependable Computing, pp. 891-899, Apr. 19, 1995.

Middeldorp et al., "DFS 2929 Foreign Device Interfaces", pp. 1-13, Oct. 2, 1987.

Middeldorp et al., "CPS 1259 Foreign Device Interface", pp. 1-11, Nov. 3, 1987.

Olson et al., "Probabilistic Clock Synchronization in Large Distributed Systems", Real-Time Computing Laboratory, pp. 290-297, May 20, 1991.

Shaughnessy, Ed, "DFS 1592 Master Timekeeper", pp. 1-32, Mar. 19, 1986.

Disclosure Statement of Invention by Inventor, Patricia Brett.

* cited by examiner

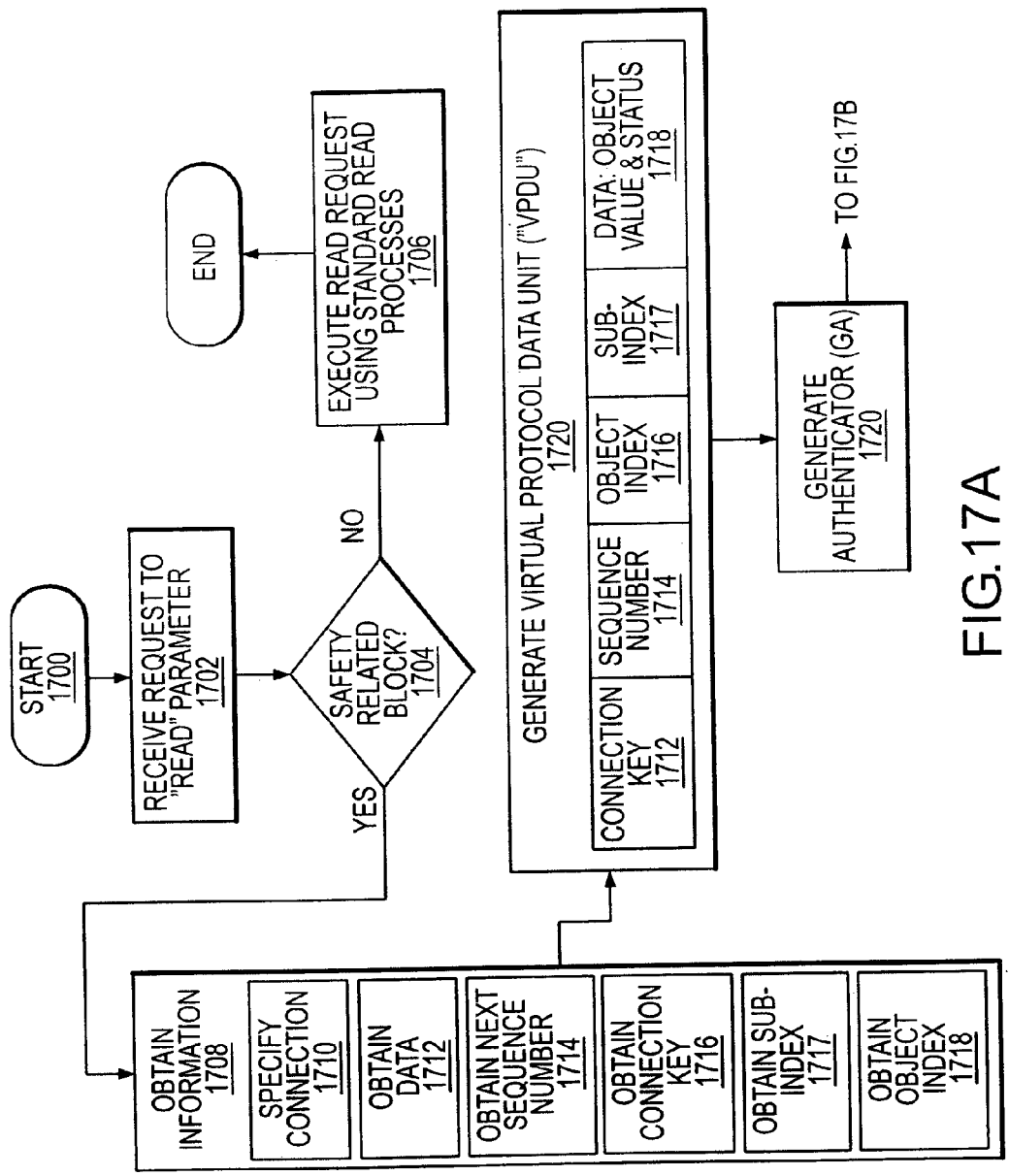

SYSTEM AND METHOD FOR IMPLEMENTING SAFETY INSTRUMENTED SYSTEMS IN A FIELDBUS ARCHITECTURE

CROSS-REFERENCE TO RELATED APPLICATIONS

This application is a continuation patent application of U.S. patent application Ser. No. 10/826,576, filed on Apr. 16, 2004 now U.S. Pat. No. 6,999,824, and entitled "System and Method for Implementing Safety Instrumented Systems in a Fieldbus Architecture"; which claims the benefit of U.S. provisional patent application No. 60/463,334, filed on Apr. 17, 2003 and entitled "Safety Instrumented Systems Function Blocks"; and Ser. No. 10/826,576 is a continuation-in-part of U.S. patent application Ser. No. 10/453,596, filed Jun. 4, 2003 and entitled "Flexible Function Blocks" now abandoned; which is a continuation-in-part of U.S. Pat. application Ser. No. 10/160,094, filed Jun. 4, 2002 and entitled "Block-oriented Control System", now U.S. Pat. No. 6,594,530; which is a continuation of U.S. Patent application Ser. No. 08/916,178, filed Aug. 21, 1997 and entitled "Block-oriented Control System", now U.S. Pat. No. 6,424,872; the disclosures of which are hereby incorporated herein in their entireties.

The present application also incorporates by reference the disclosures set forth, in their entirety, in the following patents and/or patent applications:

U.S. Provisional Patent No. 60/024,346, entitled "A Block-Oriented Control System," filed Aug. 21, 1997;

U.S. patent application Ser. No. 09/598,697, now U.S. Pat. No. 6,826,590, entitled "Block-Oriented Control System On High Speed Ethernet," filed Jun. 21, 2000;

U.S. Provisional Patent Application No. 60/139,814, entitled "Foundation Fieldbus on HSE," filed on Jun. 21, 1999;

U.S. Provisional Application No. 60/384,846, entitled "Flexible Function Blocks," filed Jun. 4, 2002; and U.S. patent application Ser. No. 10/226,282, entitled "Integrated Fieldbus Data Server Architecture," filed Aug. 23, 2002.

TECHNICAL FIELD

The technical field, to which the various embodiments of the present invention relate, is control system architecture. More particularly, the technical field relates to systems and methods for controlling the functions and operation of safety instrumented systems in automatic control systems. Even more particularly, certain embodiments of the present invention relate to systems and methods for controlling safety instrumented systems in the context of an automatic control system which links device controllers via a control network to facilitate decentralized control of industrial, manufacturing and other processes.

BACKGROUND

Industrial, manufacturing, petrochemical and other "automation industries" implementing complex processes and systems have been migrating from proprietary, centralized architectures to open, decentralized architectures to facilitate automation of such processes and systems. Decentralized architectures commonly implement fieldbus control systems and networks wherein control is distributed amongst the various devices within the network and/or system. Examples of open, interoperable and decentralized fieldbus architectures include the FOUNDATION™ fieldbus from the Fieldbus Foundation (Austin, Tex.), PROFIBUS from PROFIBUS International (Karlsruhe, Germany); LonWorks from Echelon Corporation (San Jose, Calif.), industrial Ethernet and others (hereafter, collectively "fieldbus Architectures").

The demand for open and interoperable, distributed control fieldbus systems is often driven by equipment suppliers and users. Suppliers commonly prefer fieldbus Architectures because it allows them to sell their products and/or services to more users, instead of only to users operating a specific proprietary system. Users desire to utilize fieldbus Architectures, for example, because it often enables them to select the fieldbus devices and/or services from multiple suppliers instead of only devices specifically designed for a proprietary system.

Many sectors of the automation industry also have a need for special "safety" systems to ensure the safety of plant personnel and to prevent damage to equipment due to unexpected events. These special "safety" systems are collectively called "Safety Instrumented Systems" (SIS). Users and suppliers often require SIS systems to comply with international safety standards such as International Electotechnical Committee (IEC) 61508 (functional safety of electrical/electronic/programmable electronic safety-related systems), and IEC 61511 (functional safety: safety instrumented systems for the process industry sector). Currently available SIS control solutions are commonly proprietary and are not compatible with fieldbus Architectures.

Thus, users and suppliers of SIS devices and systems have a need for an open, interoperable SIS fieldbus Architecture (hereafter, an "SIS fieldbus") that enable users to support and/or provide SIS control using existing fieldbus Architectures. Desirably, an SIS fieldbus is directly compatible with existing fieldbus Architectures and do not require modification to existing communication protocols, function blocks and/or other network aspects.

SUMMARY

An apparatus for operating in a block-oriented safety related open control system is provided by one embodiment of the present invention. Such apparatus comprises a memory, which includes at least one safety related function block, a processor, operably connected to the memory, wherein the processor executes the safety related function block based on a system schedule, and a medium attachment unit, which translates input messages and output messages between the processor and a transmission medium using an extended safety-related protocol. In another embodiment, the memory in the apparatus further includes a safety-related resource block, a first safety-related transducer block, and a second safety-related transducer block, wherein the resource block insulates the safety-related function block from physical hardware, the first safety-related transducer block decouples the input to the safety-related function block, and the second safety-related transducer decouples the output of the safety-related function block.

In another embodiment of the present invention, a system is provided for permitting interoperability between safety and non-safety related devices in a block-oriented open control system. The system comprises a plurality of safety and non-safety related devices. At least one of the safety related devices includes a safety-related resource block and a safety-related function block. Further, the safety-related resource block uniquely identifies a safety-related resource provided in the safety related device and the safety-related function block processes parameters associated with the safety-related resource to produce an output message. The system also comprises a medium attachment unit which is operably connected to at least the safety-related function block. The medium attachment unit translates an input message from a transmission medium to the safety-related function block and the output message from the safety-related function block to the transmission medium using an extended safety-related protocol.

In another embodiment of the present invention, an apparatus is provided which enhances the interoperability of a block-oriented open control system with safety related devices. The apparatus comprises a means for storing at least one safety-related function block, which includes contained parameters and a computer program. The safety-related function block includes end-user configured parameters and an end-user configured algorithm. The apparatus also comprises a means, coupled to the storing means, for processing the safety-related function block using the contained parameters. The processing of the contained parameters produces an output parameter. The apparatus also includes a means, coupled to the processing means, for translating messages from the processor for transmission on a transmission medium using an extended safety-related protocol.

Another embodiment of the present invention provides an apparatus which operates in a block-oriented open control system that includes safety related components. The apparatus comprises a user layer, which includes a safety-related function block to provide functionality. The safety-related function block includes end-user configured parameters and an end-user configured algorithm. The apparatus also comprises a physical layer, which translates messages from a transmission medium into a suitable format for the user layer and from the user layer into a signal for transmission on the transmission medium using an extended safety-related protocol. A communications stack, connected to the user layer and the physical layer, is also provided. The communications stack includes a data link layer and an application layer. The data link layer controls the transmission of messages onto the transmission medium and the application layer allows the user layer to communicate over the transmission medium.

In another embodiment of the present invention, a memory for storing data for access by an application framework operating in a device within a block-oriented open control system with safety related components is provided. The memory includes a data structure stored in the memory. The data structure further includes a safety-related function block, and a safety-related resource block. The safety-related resource block makes hardware specific characteristics of the device electronically readable. The memory also includes at least one safety-related transducer block which controls access to the safety-related function block.

Another embodiment of the present invention includes a process for communicating safety related data from a publisher to a subscriber over an open control system. The process comprises obtaining information useful in generating a first data sequence, generating the first data sequence using the obtained information, generating a first authenticator for the first data sequence, generating a second data sequence, wherein the second data sequence includes the safety related data and the first authenticator, communicating the second data sequence from the publisher to the subscriber, generating a third data sequence at the subscriber using at least one sequence of data received in the second data sequence, calculating a second authenticator at the subscriber based upon the third data sequence, comparing the received first authenticator to the second authenticator, rejecting the second data sequence from further processing when the first authenticator and the second authenticator are different, and accepting the second data sequence when the first authenticator and the second authenticator are the same.

It is to be appreciated that other embodiments of the system, apparatus, articles of manufacture and processes of the present invention are further described and set forth herein with reference to the drawing figures, the detailed description and the claims. Thus, the spirit and scope of the present invention should not be limited to the above summarized embodiments.

BRIEF DESCRIPTION OF THE DRAWING FIGURES

Figure 4:
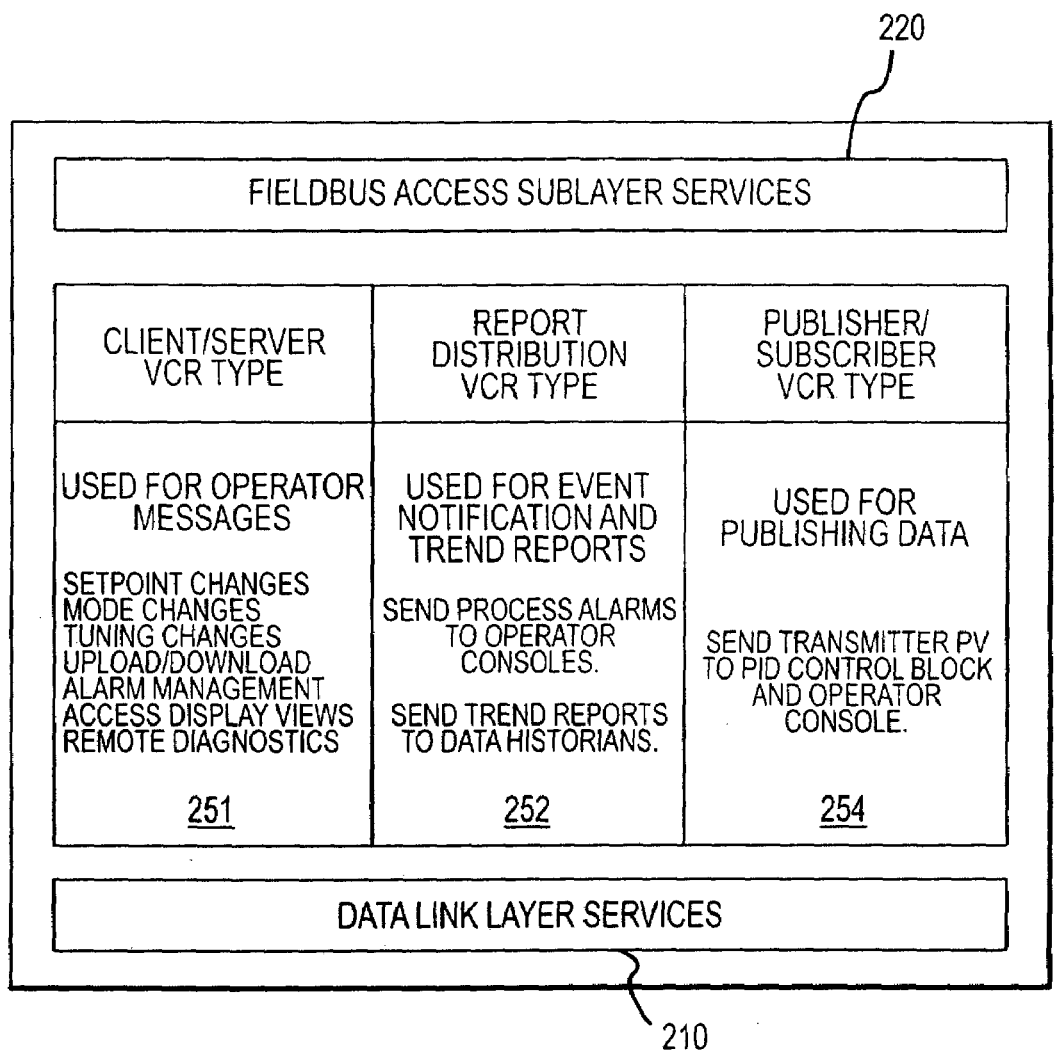

FIG. 4 summarizes the virtual communication relationships provided by the Fieldbus Access Sublayer.

Figure 5:
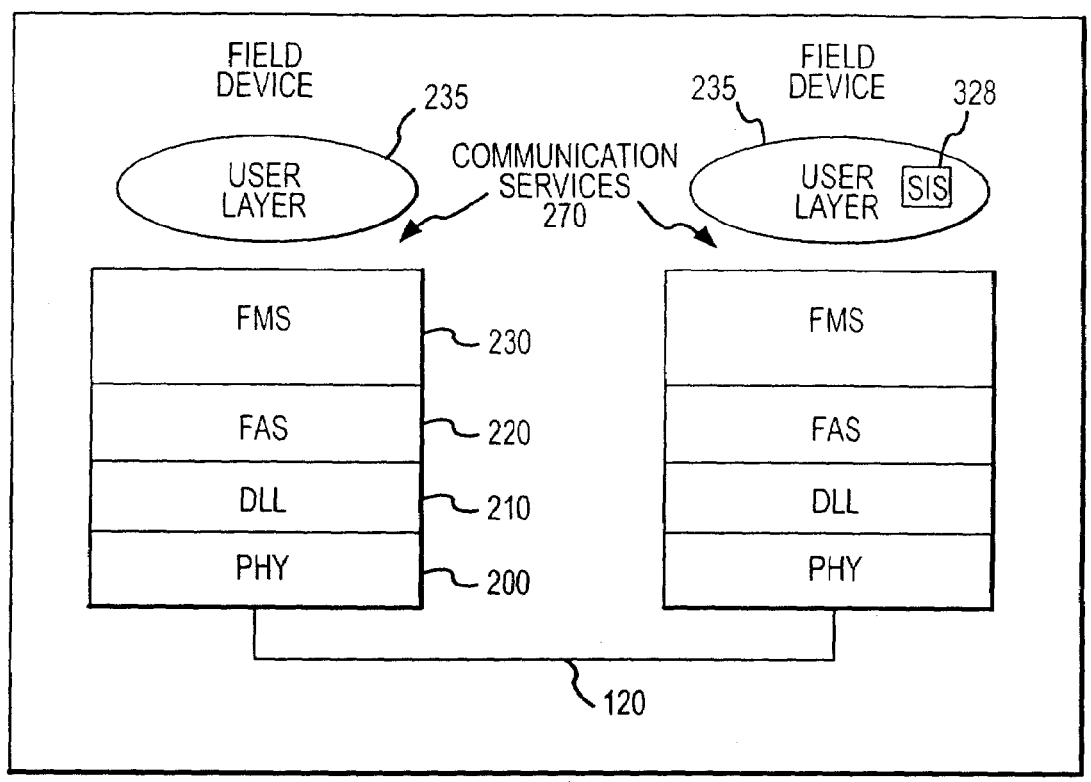

FIG. 5 illustrates two devices interconnected via the communication services one with safety-related components and one without safety-related components.

Figure 6:
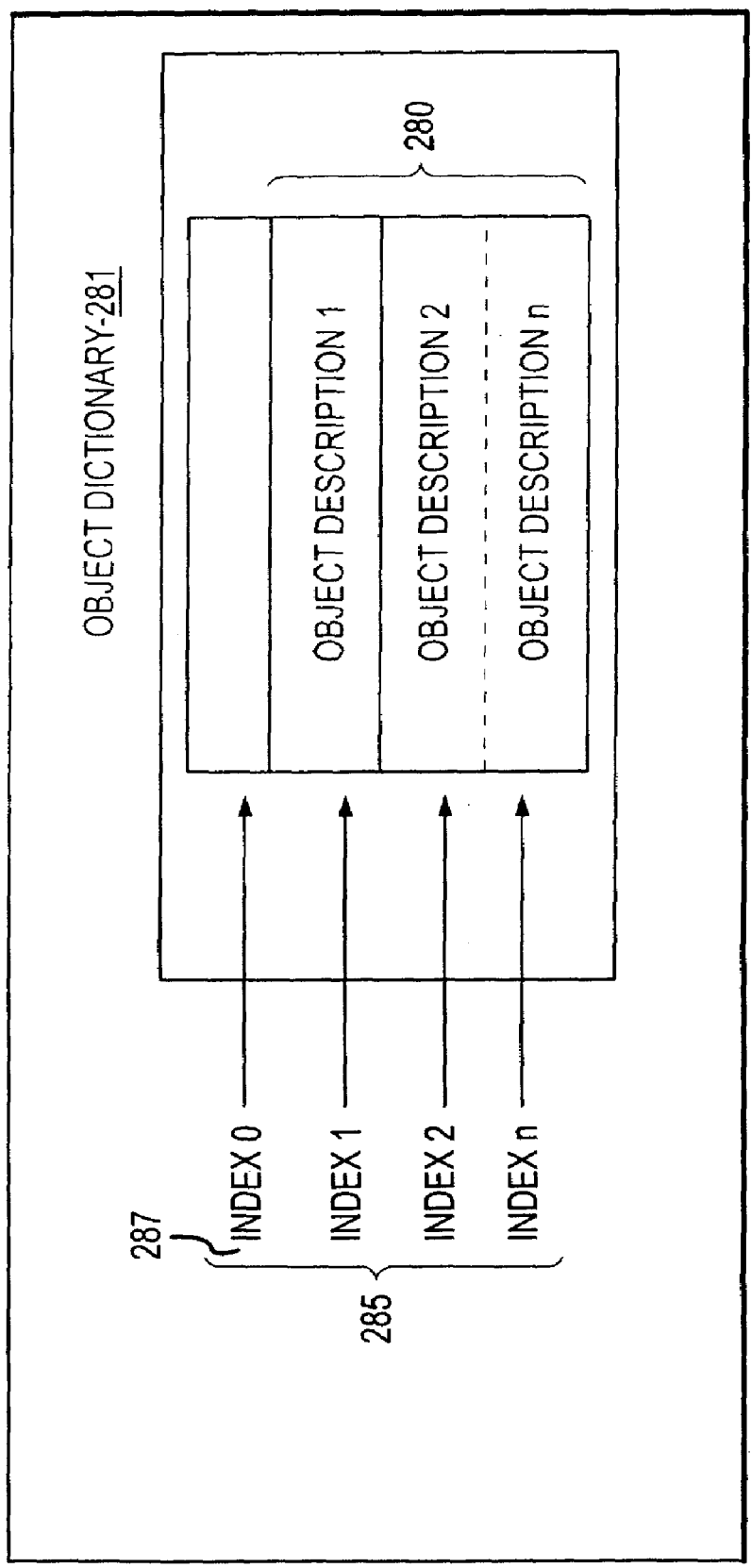

FIG. 6 illustrates an object dictionary.

Figure 7A:
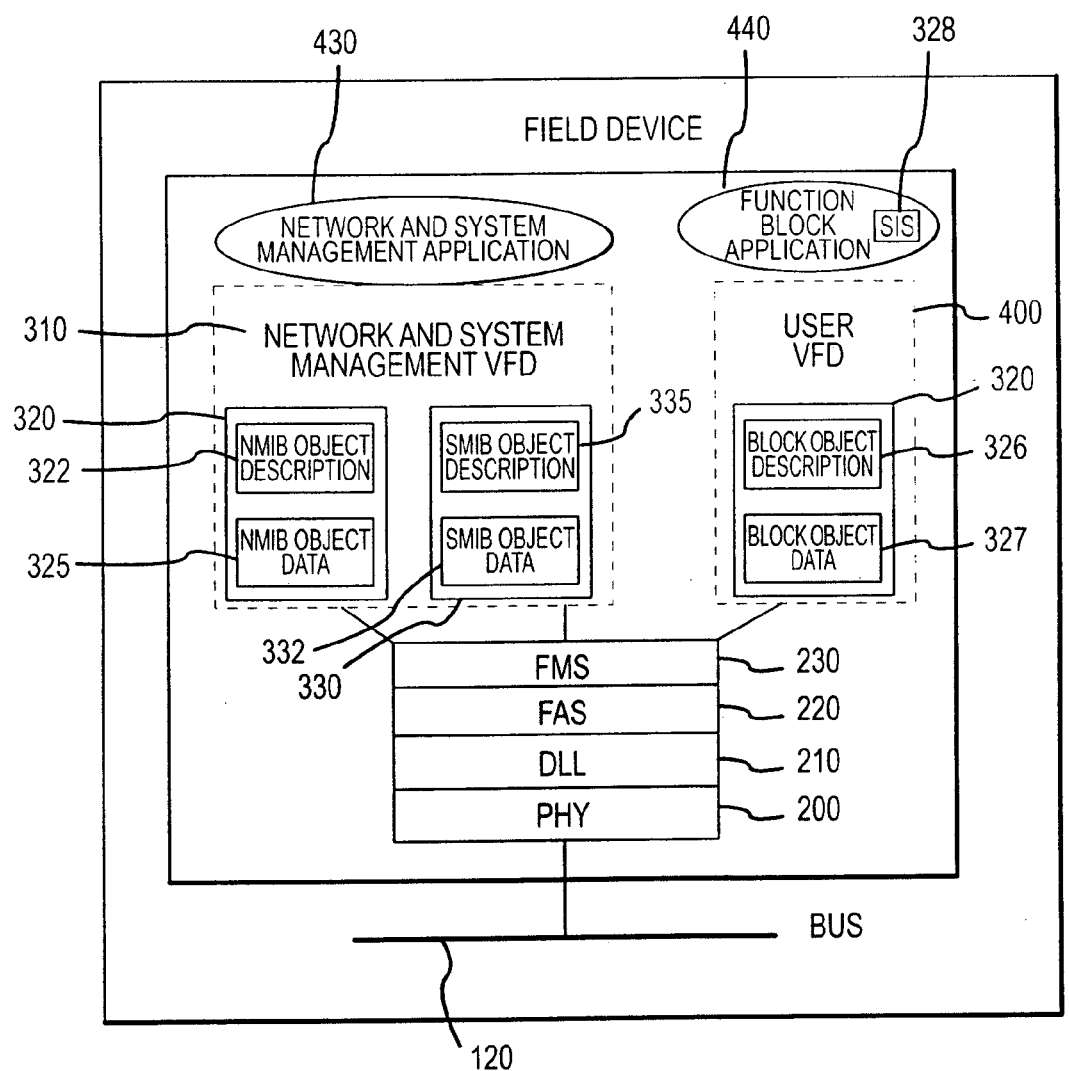
Figure 7B:
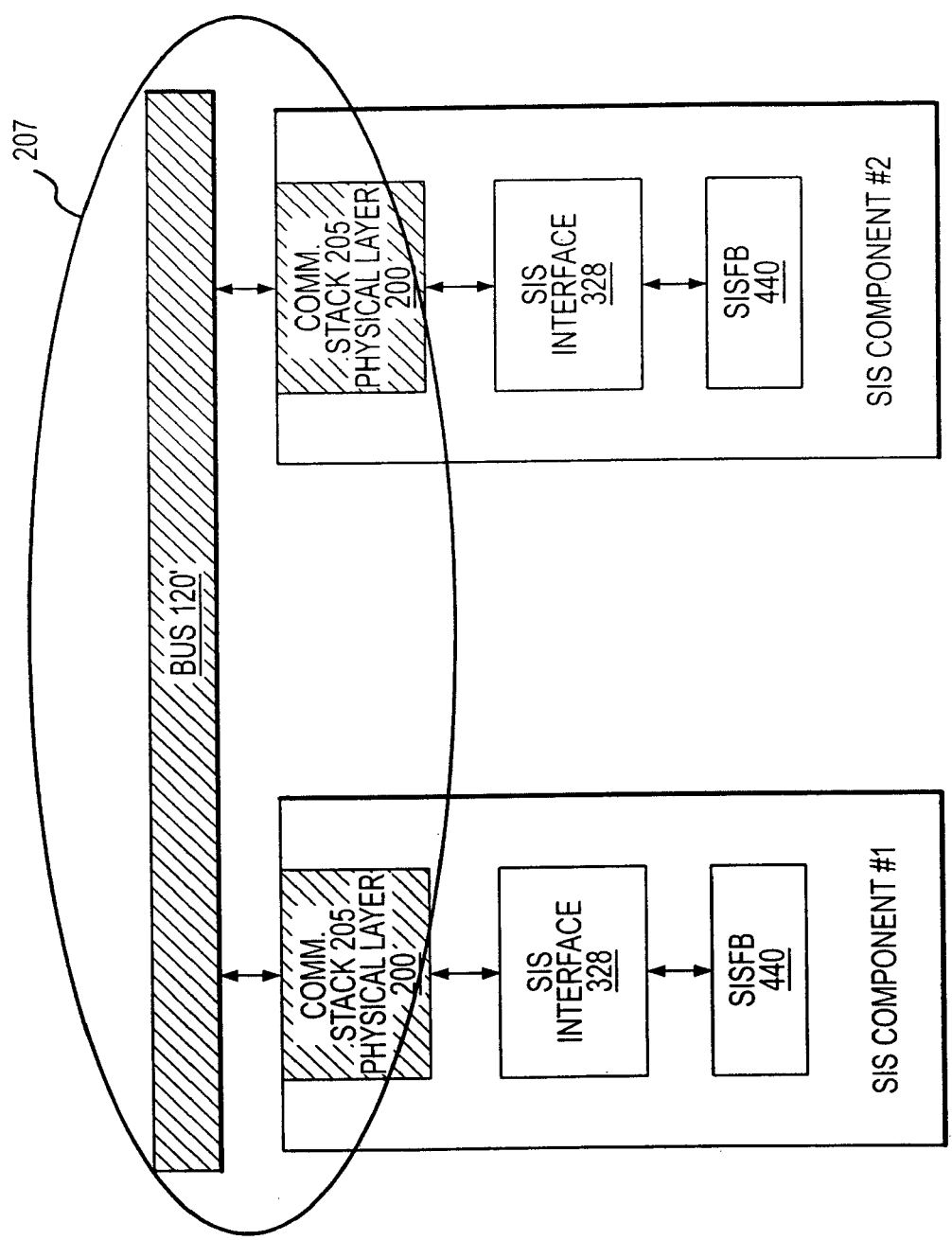

FIGS. 7A and 7B illustrate the virtual communication devices within the communication model of the present invention for use in safety and non-safety devices.

Figure 8A:
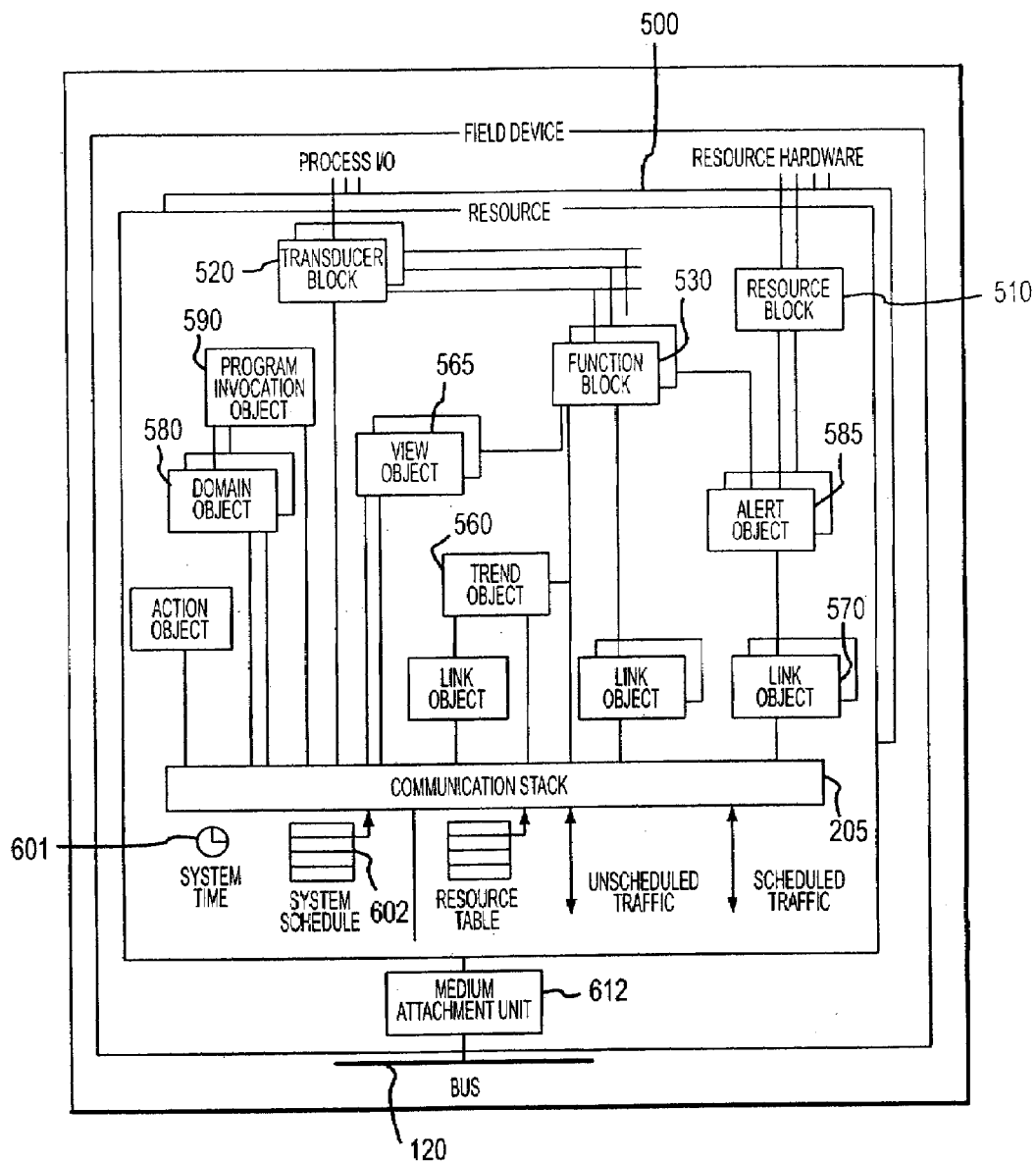
Figure 8B:
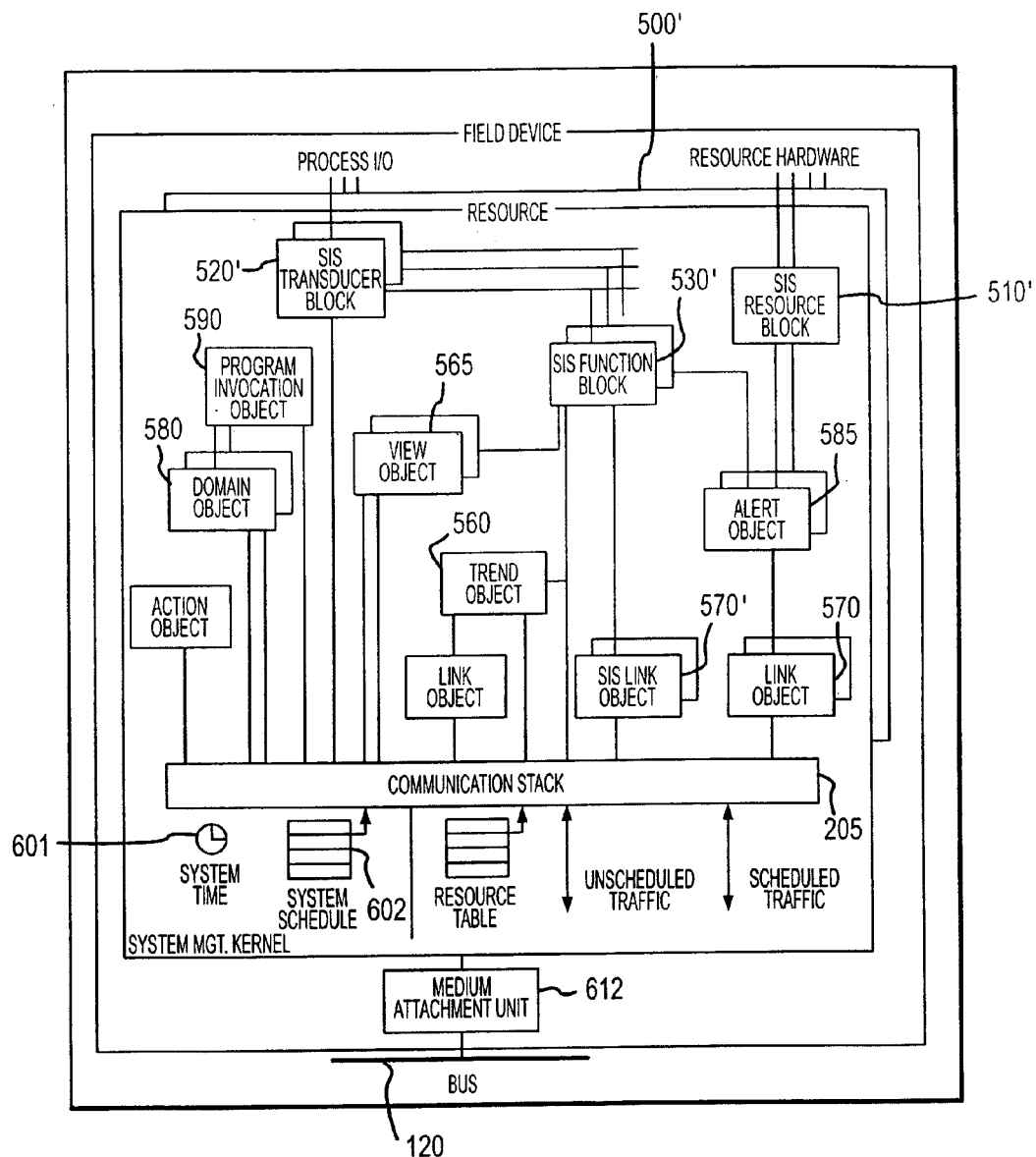

FIGS. 8A and 8B illustrate a function block application structure within a field device containing safety and non-safety related components.

Figure 9A:
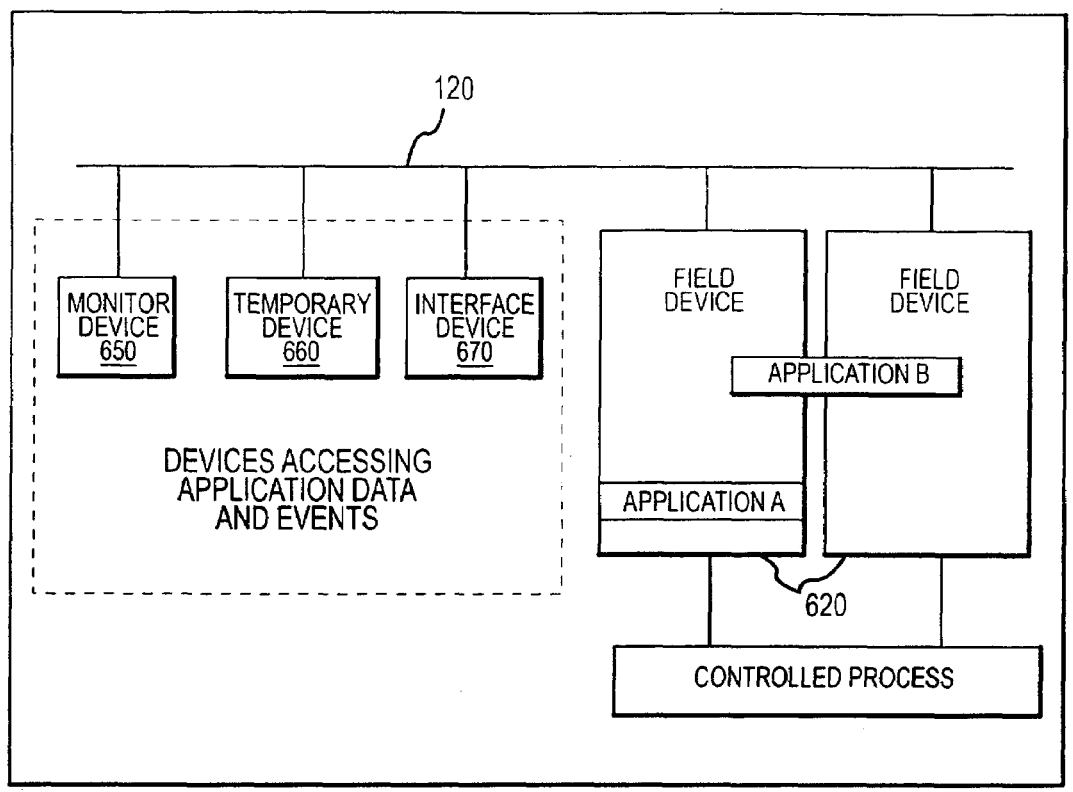
Figure 9B:
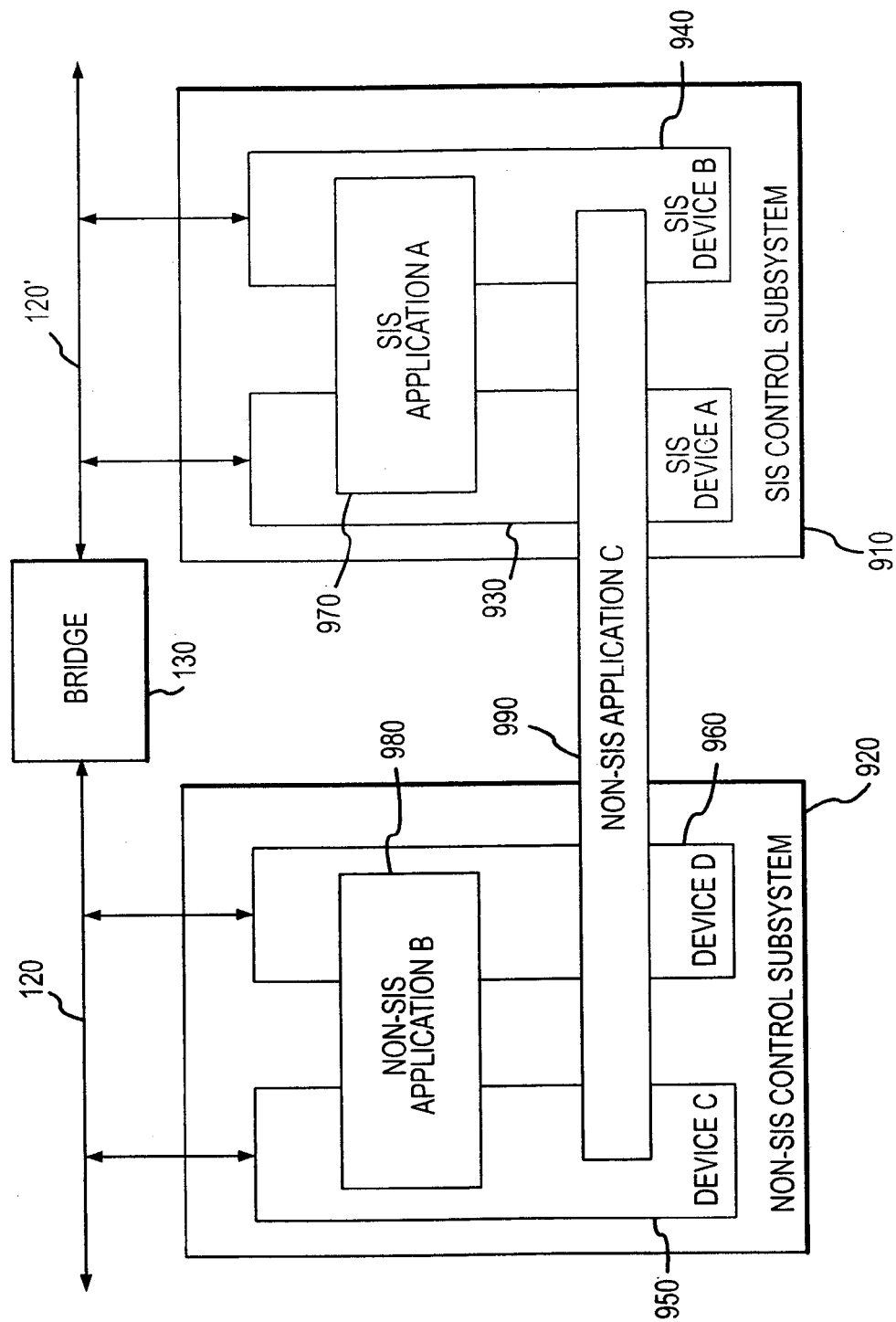

FIGS. 9A and 9B illustrate external devices interconnected on a bus with field devices for safety and non-safety implementations.

Figure 10:
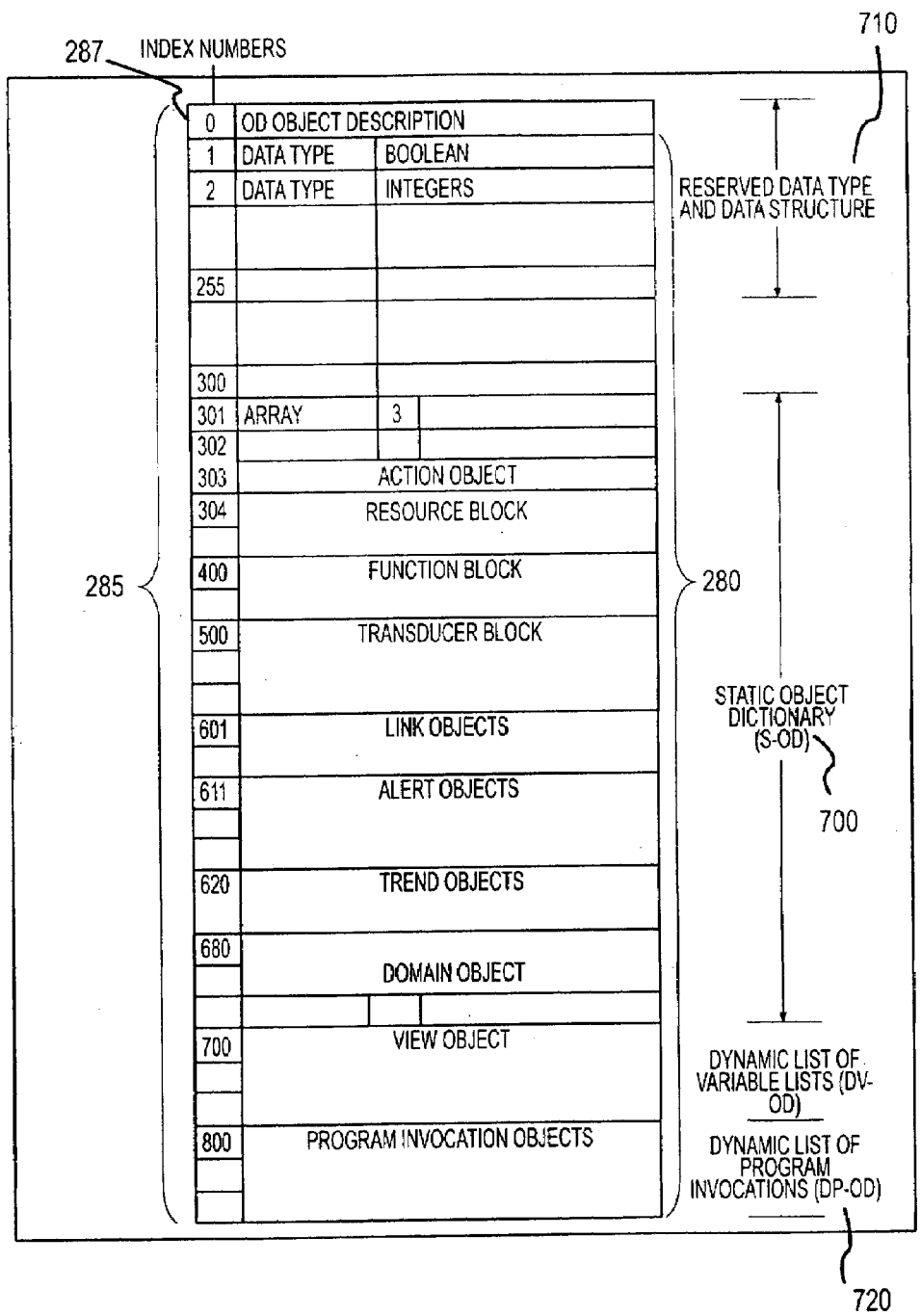

FIG. 10 illustrates the preferred layout of an object dictionary directory object.

Figure 11:
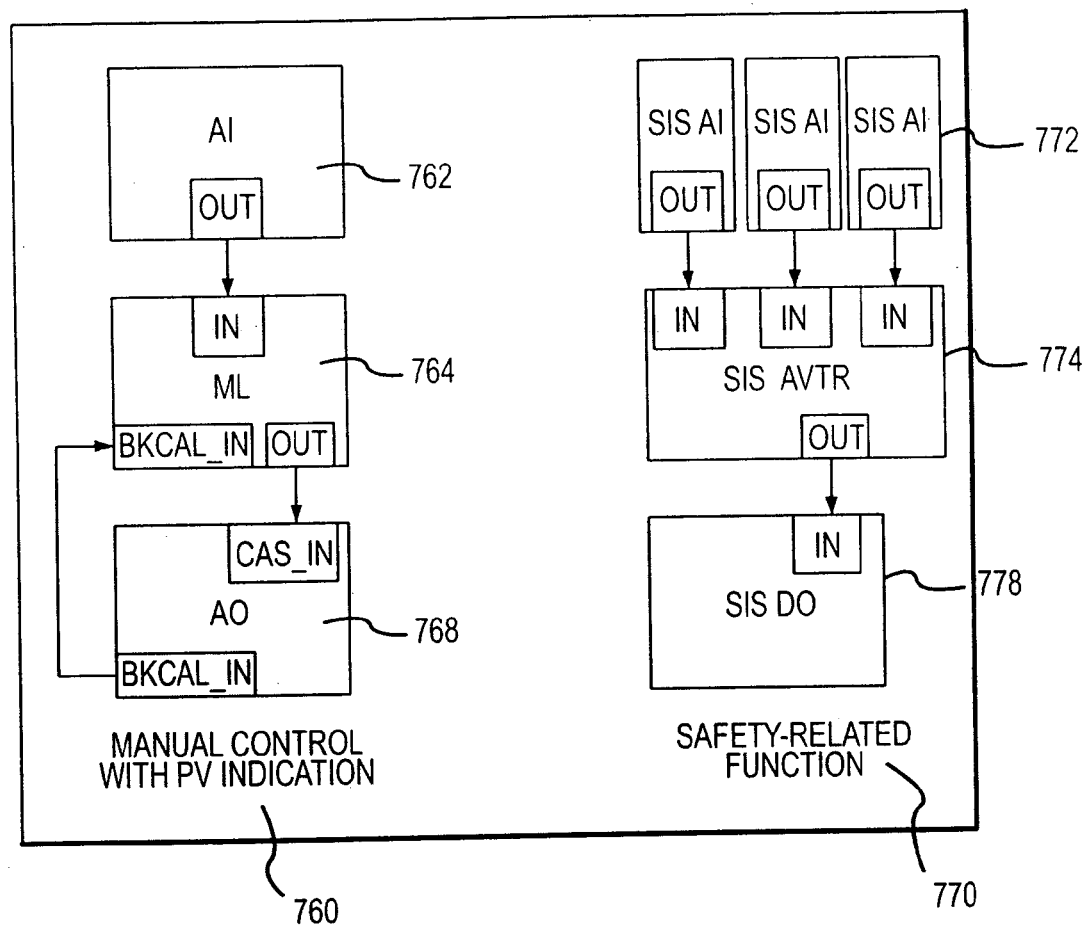

FIG. 11 illustrates examples of parameters interconnected for a single loop for safety and non-safety related components.

Figure 12:
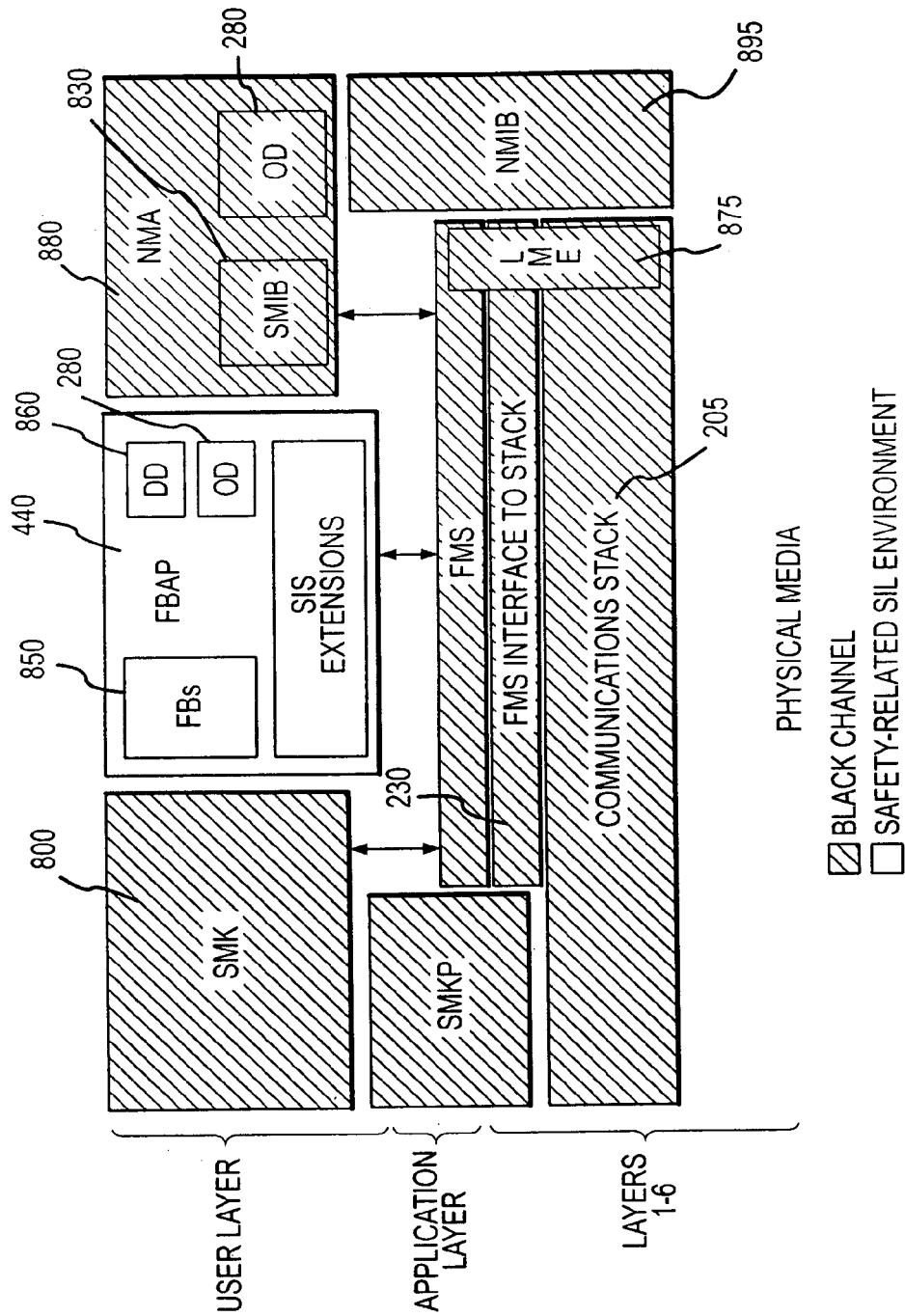

FIG. 12 illustrates one embodiment of a system architecture of the present invention.

Figure 13:
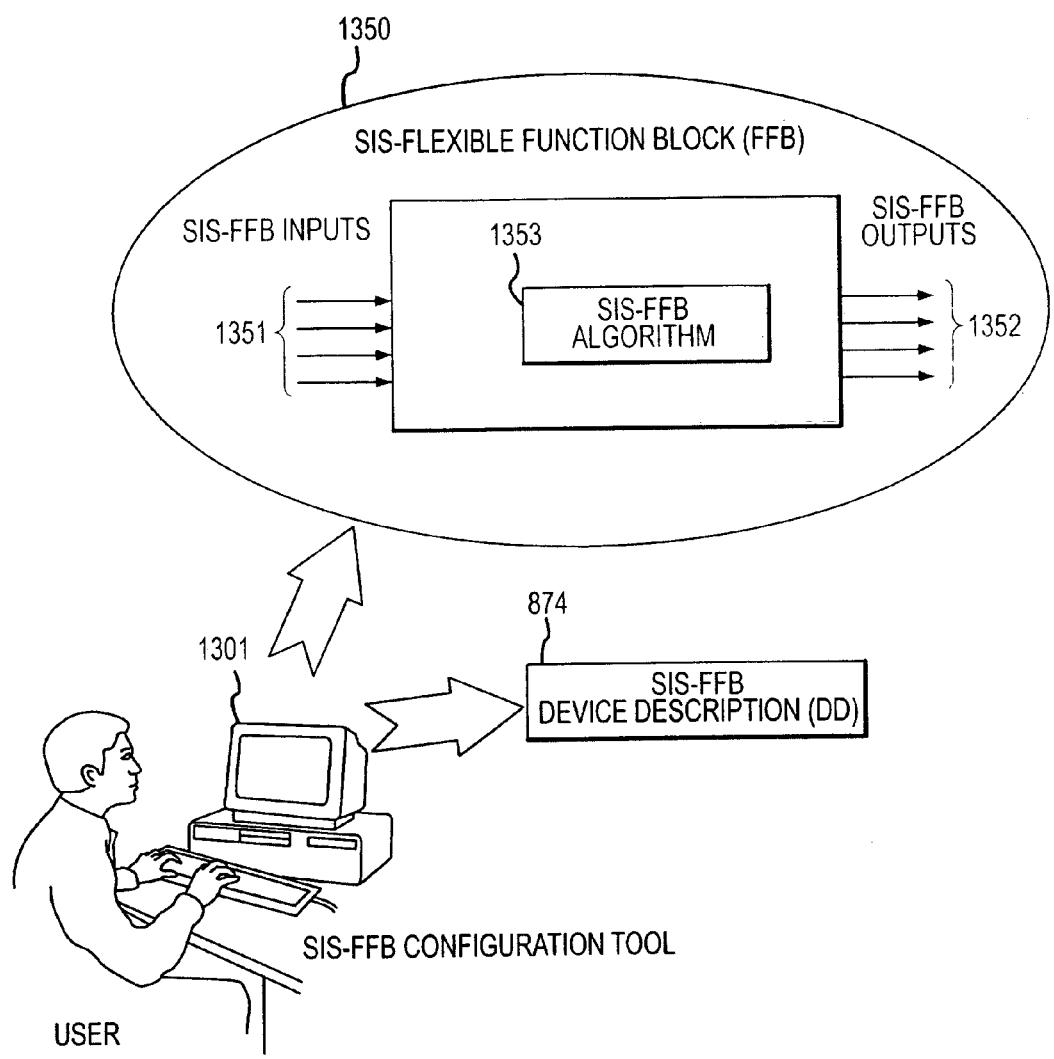

FIG. 13 illustrates a safety-related function block with user configurable inputs, user configurable outputs, and a user configurable algorithm.

Figure 14:
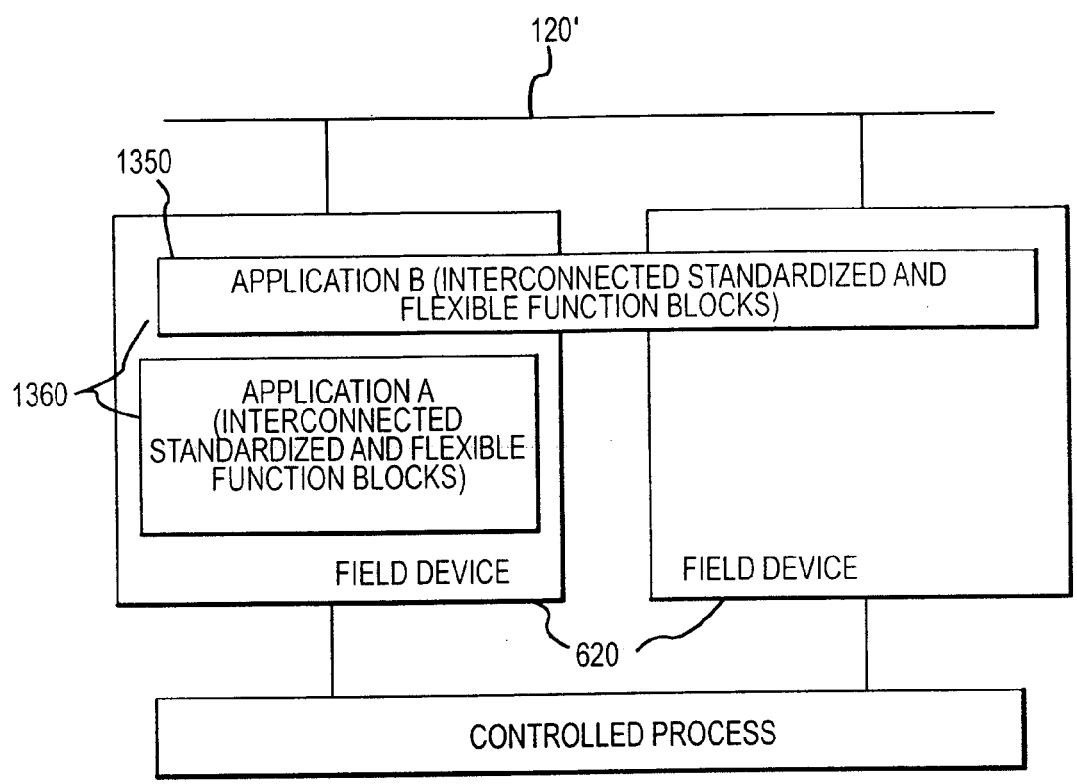

FIG. 14 illustrates an application using standardized safety and non-safety related function blocks and flexible function blocks for at least one embodiment of the present invention.

Figure 15:
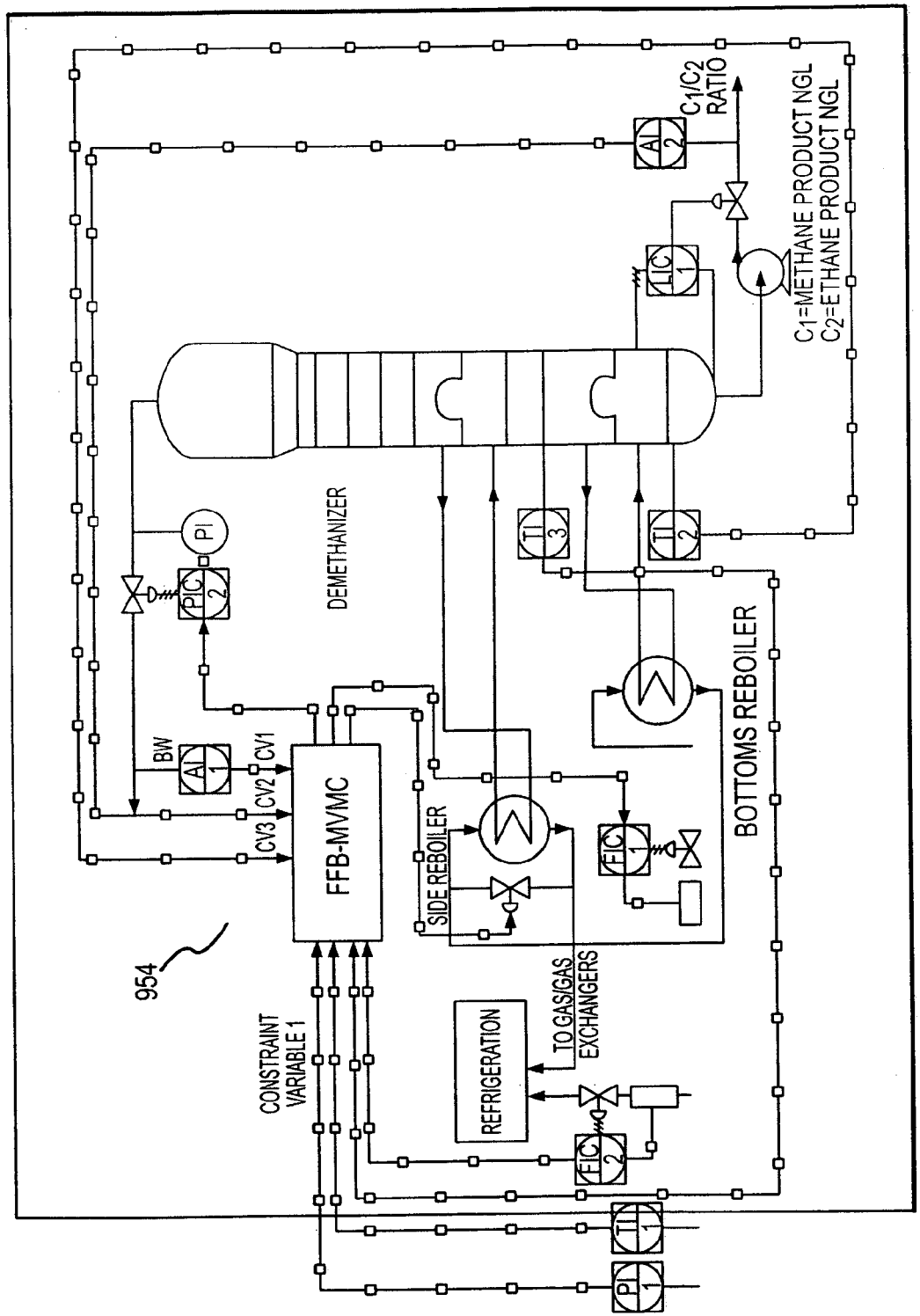

FIG. 15 is a block diagram illustrating an example of an application using standardized, flexible function blocks and FFBs.

Figure 16A:
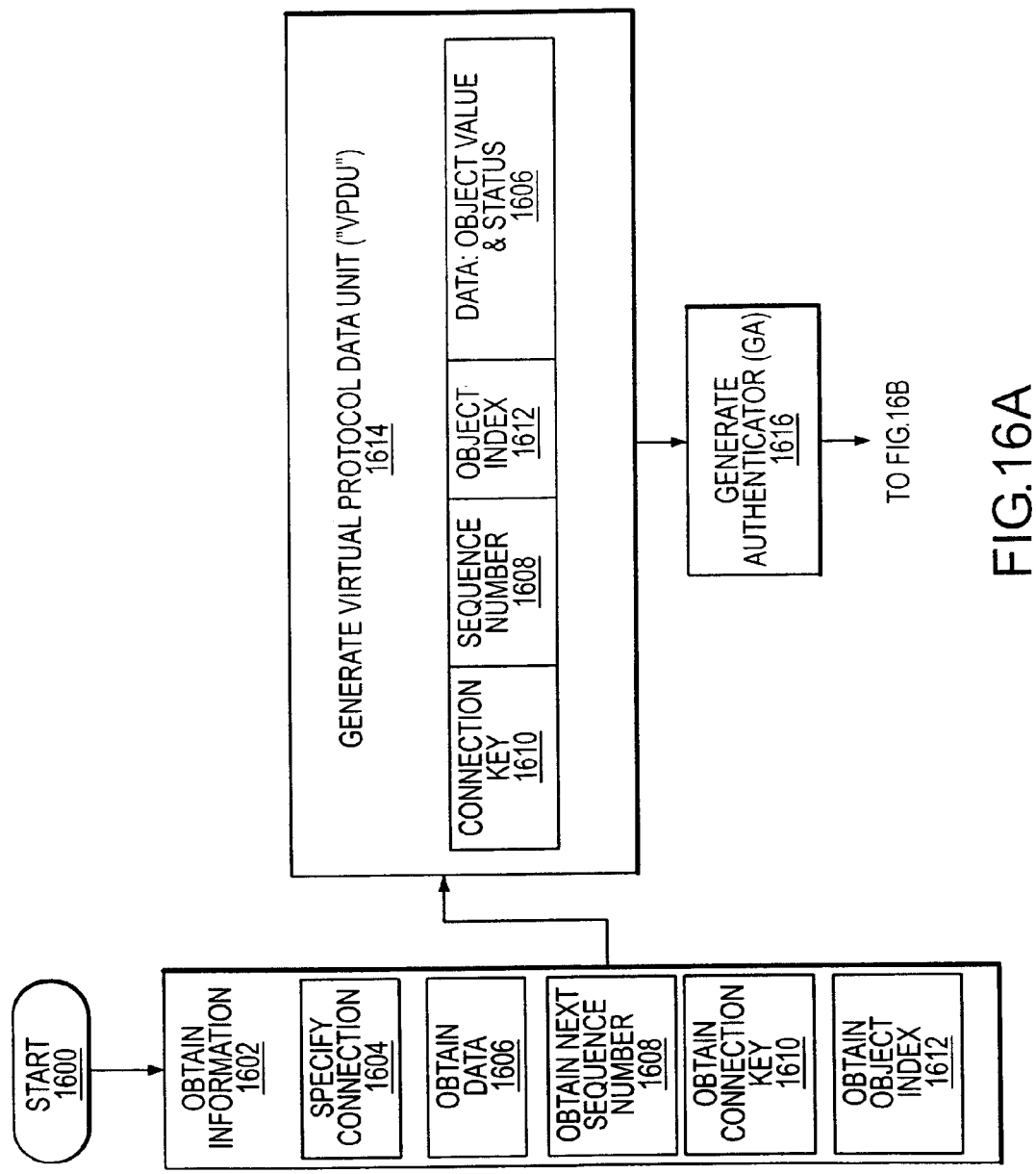
Figure 16B:
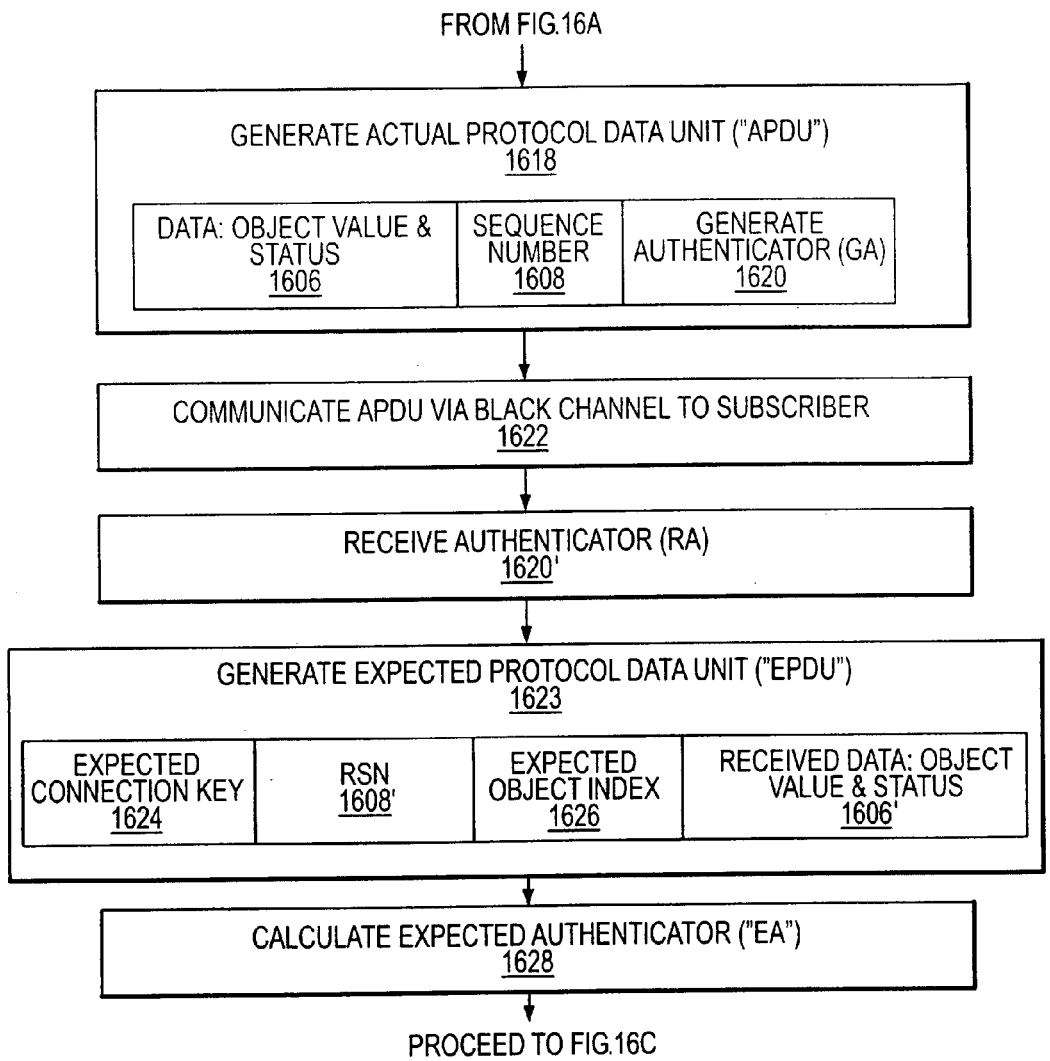
Figure 16C:
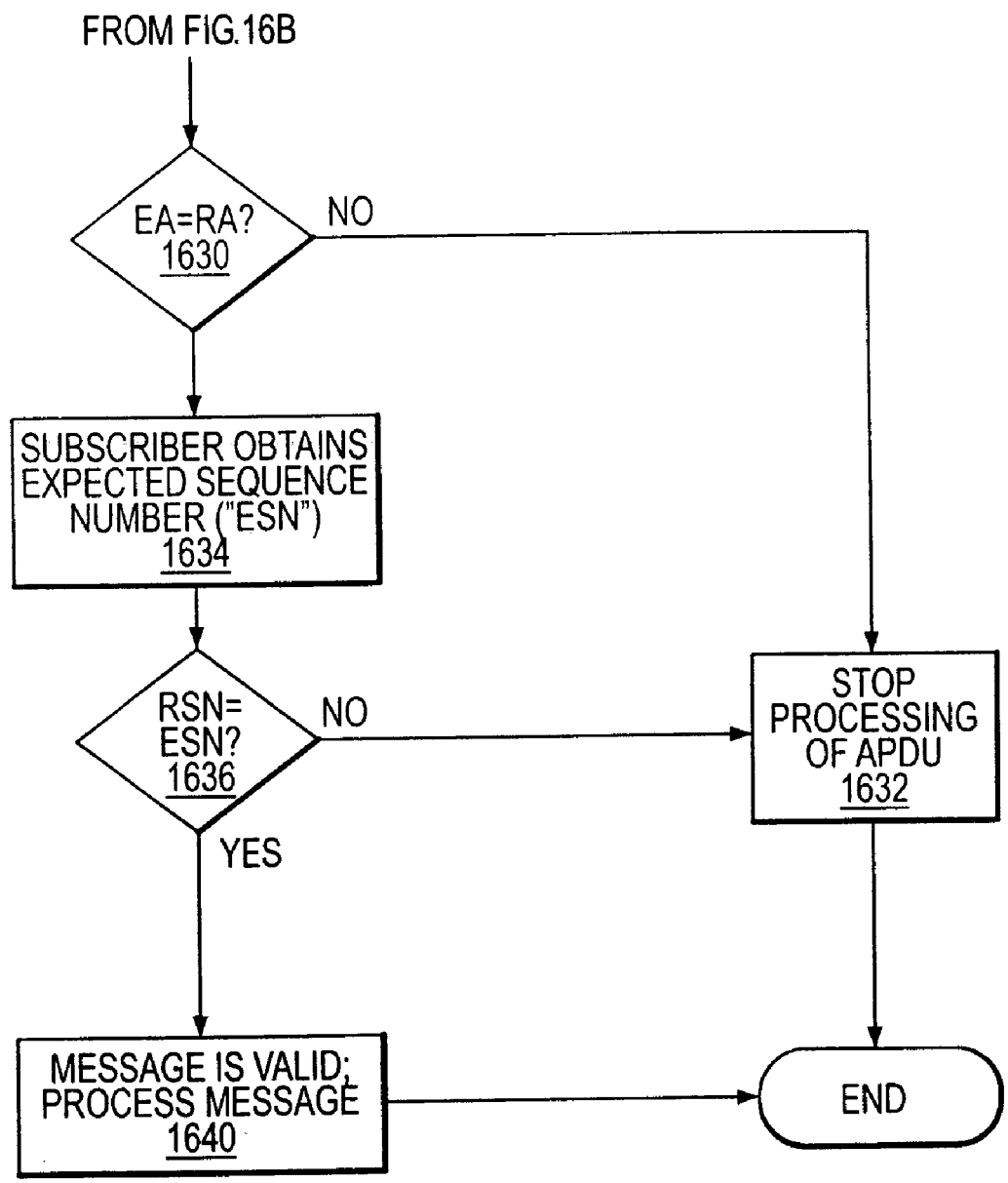

FIGS. 16A, 16B and 16C are a flow diagram illustrating one methodology by which data may be communicated, using a publisher-subscriber topology, and authenticated for safety-related function blocks and safety-related flexible function blocks.

Figure 17B:
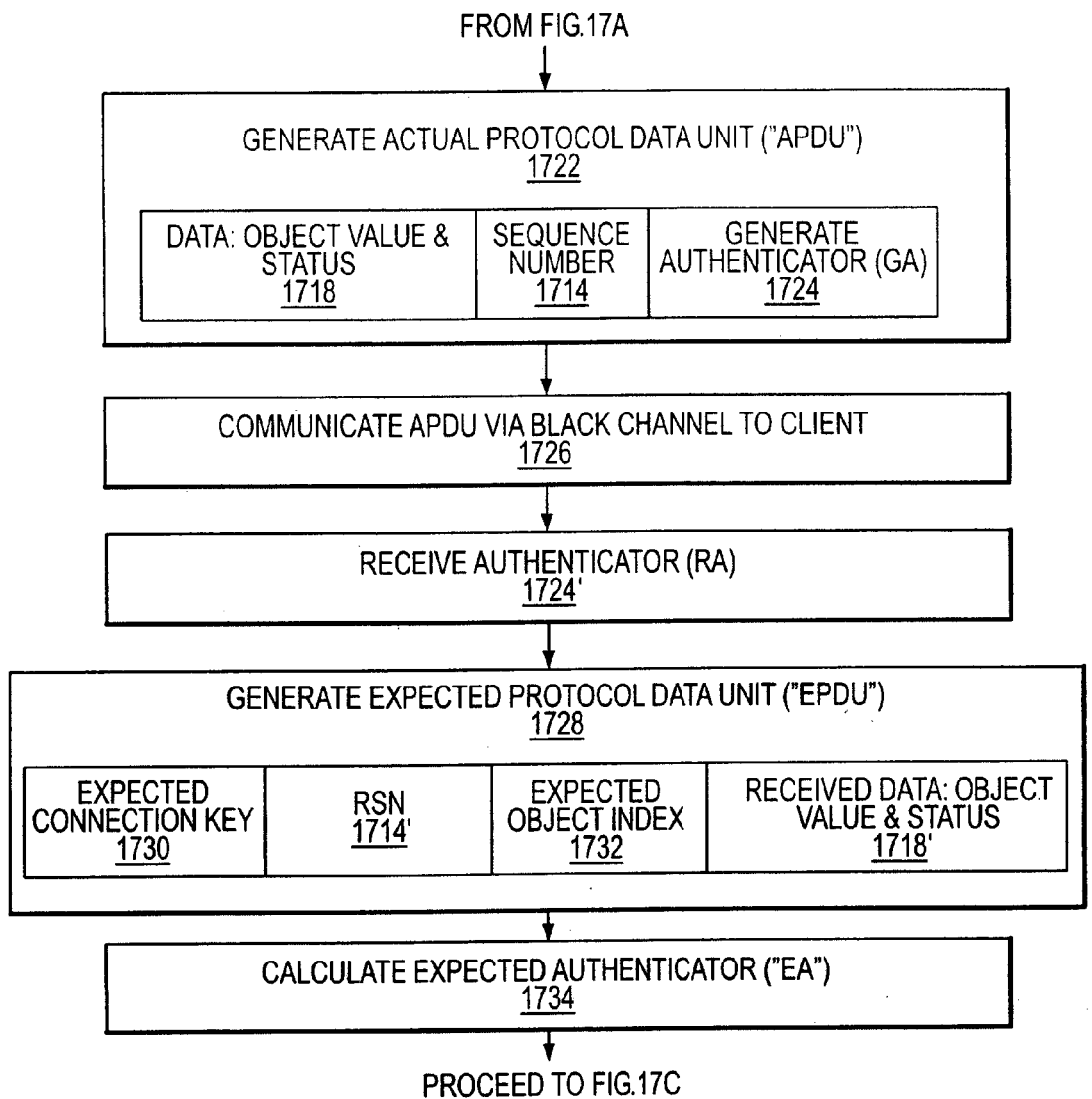
Figure 17C:
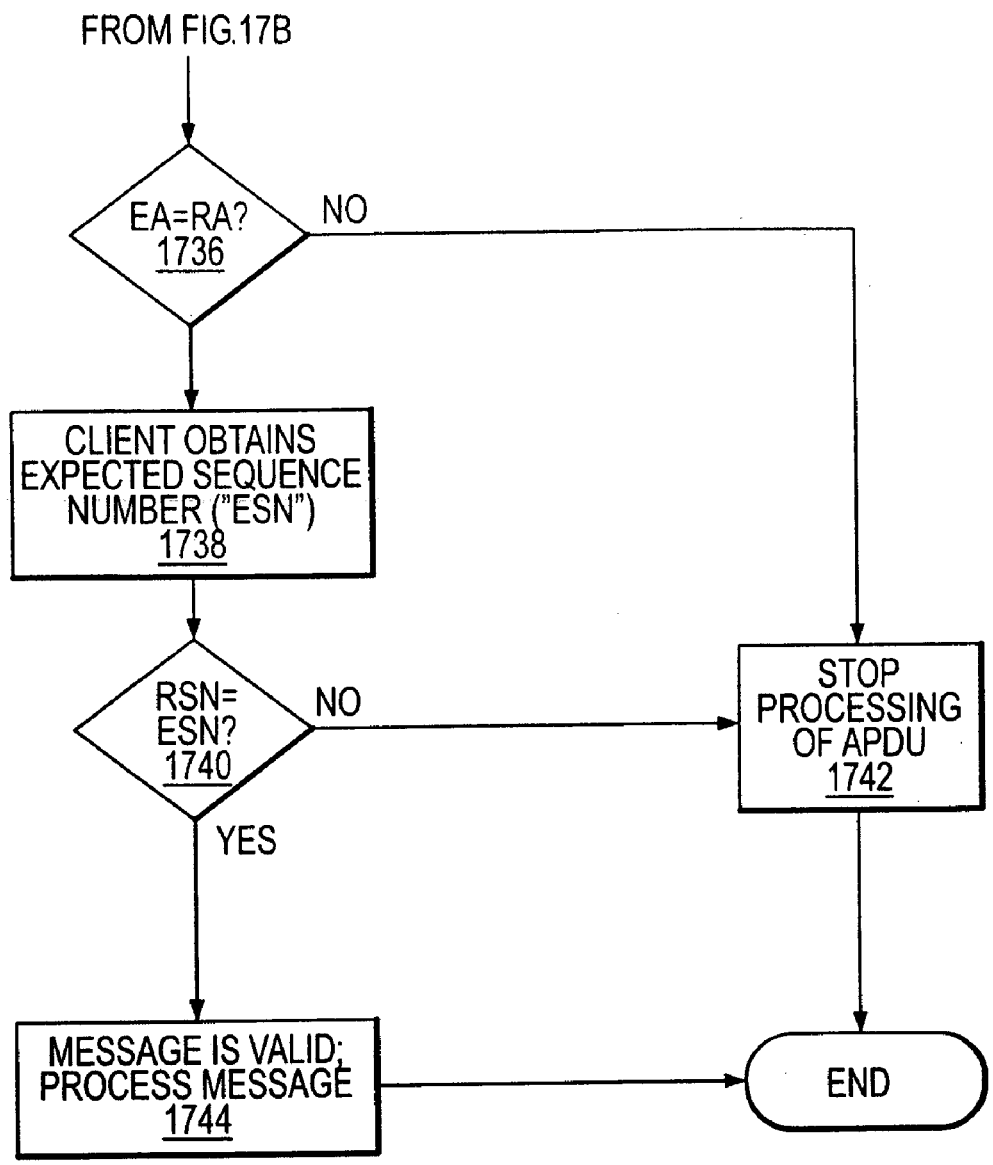

FIGS. 17A, 17B and 17C are a flow diagram illustrating one methodology by which data may be communicated, using a client-server topology, and authenticated for safety-related function blocks and safety-related flexible function blocks.

DETAILED DESCRIPTION

As described herein, the various embodiments of the present invention provide systems, components and methods (hereafter, collectively "systems") for utilizing SIS devices in new and/or existing fieldbus Architectures. Desirably, the various systems set forth herein may be utilized in various types and forms of SIS devices as well as in various types of fieldbus Architectures. Further, the various systems of the present invention may desirably be utilized in various fieldbus Architectures without significant, and preferably zero, changes to the protocols, methodologies or other processes currently utilized in fieldbus Architectures to communicate non-SIS information across the network for notification to and/or utilization by network compatible fieldbus devices.

More particularly, one embodiment of an SIS implementation may include an apparatus configured for operating in an open control system that includes: a memory, which includes system management data; one or more SIS elements; a processor, operably connected to the memory; a medium attachment unit, which translates input messages and output messages between the processor and a transmission medium; and an extended safety or safety-related protocol ("SISRP"), which provides the desired level of security needed for a particular SIS implementation. The system management data may include system schedule information which the processor desirably executes as specified by the system schedule.

Another embodiment of the present invention may provide for an SIS implementation in a fieldbus Architecture by, for example, permitting interoperability between a plurality of devices, at least one of which includes an SIS component ("SISC"), such as a resource block, a function block, a transducer block or a link object, and a medium attachment unit, operably connected to the SISC. In such an embodiment, the resource blocks uniquely identify each device, the function block processes parameters to produce an output message, and the medium attachment unit translates input message(s) received, for example, from a transmission medium to the SIS device and output messages from the SIS device to the transmission medium. Such an embodiment may be considered to be a function block implementation.

Yet, other implementations may also be provided by and/or used in conjunction with the teachings of the present invention. In one such embodiment of the present invention, an apparatus is provided which desirably includes: a user layer, that includes an encapsulated SISC to provide functionality; a physical layer, which translates messages from a transmission medium into a suitable format for use by the user layer and from the user layer into a signal for transmission on the transmission medium; and a communications stack, connected to the user layer and the physical layer. The communication stack may include a data link layer and an application layer. The data link layer controls the transmission of messages onto the transmission medium. The application layer allows the user layer to communicate over the transmission medium.

Another embodiment of the present invention may provide for an SIS implementation in a fieldbus Architecture by permitting interoperability between a plurality of devices, wherein at least one device includes a resource block, a link object, and a medium attachment unit, operably connected to the link object. In such an embodiment, the resource blocks uniquely identify each device, the link object receives processed parameters and produces an output message, and the medium attachment unit translates an input message from a transmission medium to the link object and the output message from the link object to the transmission medium.

Yet, another embodiment of the present invention may include an apparatus that desirably includes: a user layer, which includes one or more encapsulated SISC(s) to provide functionality; a physical layer, which translates messages from a transmission medium into a suitable format for the user layer and from the user layer into a signal for transmission on the transmission medium; and a communications stack, connected to the user layer and the physical layer. The communication stack includes a data link layer and an application layer. The data link layer controls the transmission of messages onto the transmission medium. The application layer allows the user layer to communicate over the transmission medium.

Likewise, the foregoing and other embodiments of the present invention may include a memory for storing data for access by an application framework operating in a device within a control system. The memory includes a data structure stored in the memory, the data structure including one or more SISCs, such as a resource block, which makes hardware specific characteristics of the device electronically readable, an encapsulated function block, and at least one transducer block. The function block includes end-user configured program and parameters and the at least one transducer block controls access to the function block.

Thus, it is to be appreciated that the various embodiments of the present invention may be provided for in various forms of devices and systems. Some of which utilize SISCs and/or an SISRP to incorporate SIS devices into existing fieldbus Architectures. For purpose of clarity and simplicity, however, the various embodiments of the present invention are hereinafter primarily described herein with reference to one embodiment of a fieldbus Architecture, namely, one which utilizes function blocks to provide a general structure for specifying different types of device functions while utilizing a common fieldbus communications network.

As is commonly known and appreciated, a function block implementation of a fieldbus Architecture defines the internal components of an application, or portion thereof, implemented by a device to provide for system operation. Function block applications specify how each application, or portion thereof, interfaces with each other application in the system so as to provide for standardized inter-operability between devices.

One implementation of a function block implementation of a fieldbus Architecture has been specified as the FOUNDATION™ fieldbus specifications as provided by the Fieldbus Foundation of Austin, Tex. As is commonly known and appreciated, the FOUNDATION™ fieldbus specifies a lower speed fieldbus (H1) optimized for process control, and a High Speed Ethernet (HSE) fieldbus backbone for high performance control, subsystem integration, and management information systems integration. The control system can support a variety of field devices, including sensors and actuators, or high speed field devices, such as cell control, motors, drives and remote input/output (I/O). Since FOUNDATION™ fieldbus is open and interoperable, distributed control architecture, control devices from by different vendors interoperate on the H1 or HSE fieldbus and share the control functions (e.g., control is distributed into the fieldbus devices). Distribution of control into the fieldbus devices often reduces system installation cost because the need for centralized control computers and I/O subsystems are reduced or eliminated. Further, distribution of control into fieldbus devices often reduces system operating and maintenance costs because standard function blocks in the devices provide more information about process measurements and device status. It is in this context, that one embodiment of the present invention for providing for fieldbus control of SIS devices is set forth herein. It is to be appreciated, however, that the present invention is not limited to below described Fieldbus Foundation implementation and may be incorporated into other fieldbus Architectures.

In particular, one embodiment of the present invention utilizes a FOUNDATION™ fieldbus Architecture to provide a new and improved control system architecture with enhanced and additional communication security. Such communication security is provided in addition to and/or "above" the security provided by existing communication systems while utilizing new, security related, function blocks which are compatible with an existing function block framework, such as the framework provided in the FOUNDATION™ fieldbus specifications. It is to be appreciated that the new system commonly eliminates and/or significantly reduces, the need for expensive and difficult to maintain custom control software and special input/output "I/O" devices for SIS applications. The safety-related function blocks described herein, with reference to this and similar embodiments, are collectively referred to herein as Safety Instrumented System Functions Blocks ("SISFB")—one embodiment of an SISC.

SISFB System Overview

Figure 1:
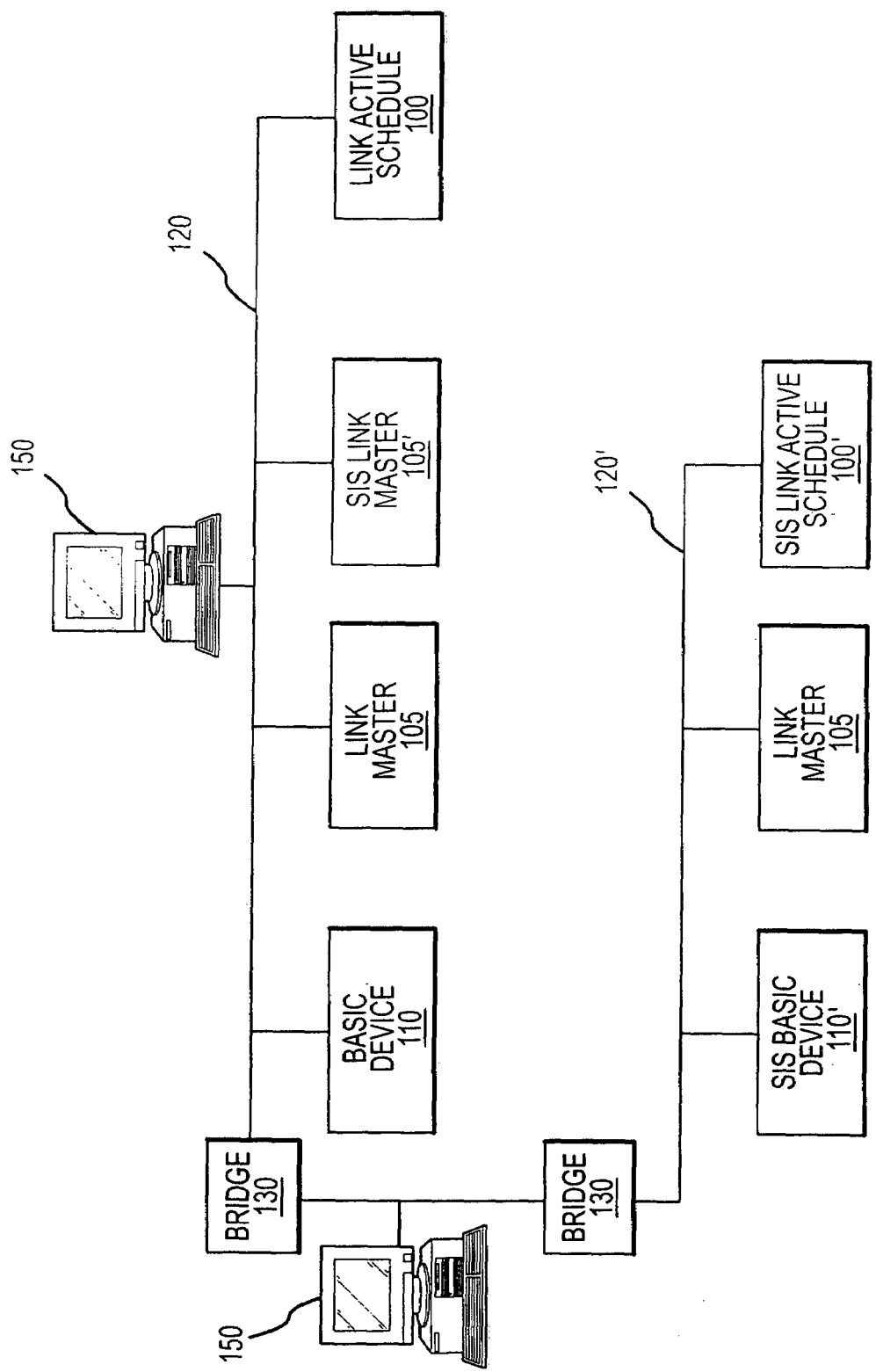
FIG. 1 is an overview of an extended control system which may be utilized in conjunction with one or more embodiments of the present invention to support an SIS fieldbus.

As shown in FIG. 1, a field device (which may contain one or more SISCs) is one which operates on a fieldbus Architecture control system and is generally categorized as a non-SIS compatible link active scheduler 100, an SIS compatible link active scheduler 100', a (non)-SIS compatible link master 105/105', or a (non)-SIS compatible basic device 110/110'. As is discussed in greater detail below, SIS and non-SIS components in SIS devices (i.e., link active schedulers, link masters and basic devices) are substantially similar, but, SIS components utilize an additional extended safety or SISRP to ensure communications between SISCs are secure and have not been corrupted, modified or otherwise degraded. Thus, when SIS devices are included in a fieldbus Architecture control system, such SIS field devices may be further categorized as an SIS link active scheduler 100', an SIS link master 105', or an SIS basic device 110'. SISCs may communicate with other SISCs and/or non-SISCs (for example, for purposes of reporting and other uses) using existing fieldbus Architectures such as bus 120 and/or 120'.

Regardless of whether a field device includes an SISC, a field device is categorized based upon its control capabilities and responsibilities. For example, a field device is categorized as a link active scheduler 100/100' if it is acting as network controller of a bus 120/120'. A field device is categorized as a link master 105/105' if it is capable of acting as the network controller or link active scheduler, but has not assumed that responsibility. A basic device 110/110' is not capable of acting as the network controller.

The field devices are electronically coupled or connected by a transmission medium 120/120', which can be individual input and output wires or a variety of bus configurations. As shown in FIG. 1, the embodiment uses a bus configuration by which both field devices with SISCs and non-SISCs may be connected. The throughput rate of the bus may vary. A few of exemplary buses are the 31.25 kbits H1 bus and the 100 Mbit/s HSE bus. However, other bus data transfer rates and configurations may be suitably utilized in conjunction with the various embodiments of the present invention. Bus data transfer rates are generally independent of whether SISC and/or non-SISC field devices are connected to the control system. It is to be appreciated that the bridges 130 (FIG. 1) and buses 120/120' may be suitably replaced by other system configurations. For example, one embodiment may utilize HSE devices which are connected in a star topology by Ethernet switches. Other system and/or network embodiments may also be utilized.

In the presently described embodiment, however, the H1 bus is generally used for process control applications, such as temperature, level, and flow control. The HSE bus is generally used for high speed applications. Devices operating on HSE buses are usually self-powered or draw power from a separate power bus in the fieldbus cable (i.e., 4 wire cable), however, they can also be powered directly from the fieldbus.

In the embodiment shown in FIG. 1, there are several link master devices 105/105' operating on the bus(es) 120/120'. When these link master devices 105/105' are activated, these (SIS) link master devices 105/105' bid for the responsibility of becoming the link active scheduler 100/100'. In the embodiment shown, the link master device 105/105' which becomes the link active scheduler 100/105' is the device with the lowest network address. In alternative embodiments, a particular device may be the "preferred" link master. In which case, when the system is activated the link master 105/105' with the lowest network address would assume the responsibilities of the link active scheduler 100/100'. Then, the "preferred" link master 105/105' would send a message to the link active scheduler 100/100' directing it to transfer control. Upon receipt of the message, the link active scheduler 100/100' would transfer control to the preferred link master 105/105'.

Further, when SIS devices are connected to the control system, for example, on bus 120 or 120', preferably the link master designated as the link active scheduler is SIS compatible. As shown in FIG. 1, the bus 120' is suitably controlled by an SIS link active scheduler 100' because of the existence of the SIS basic device 110' on the network 120'. As is discussed in greater detail hereinbelow, SISCs in SIS field devices 110' are commonly configured to accept inputs and instructions from SISCs in other SIS devices and not from non-SISCs in SIS or non-SIS devices. Non-SISCs in SIS or non-SIS devices, however, commonly can accept inputs and instructions from SISC or non-SISC components. Thus, when SISCs are included in a network, desirably the designated link master scheduler include any necessary SISCs.

When multiple link masters 105/105' exist on a bus 120/120', there are a variety of ways to conduct the bidding process. For example, one type of bidding process is shown in U.S. Pat. No. 5,526,358, issued Jun. 11, 1996, which is hereby incorporated by reference in its entirety. The bidding process may also be conducted if the link active scheduler 100/100' controlling a bus 120/120' malfunctions or is removed. Yet, when SIS devices 105' are on a bus, the link active scheduler should be selected from an available SIS link master 105'.

The control system can also include a bridge 130 to interconnect individual buses and create larger networks. Communication between the individual buses can be monitored by one or more operator stations 150. Further, in an SIS embodiment, the operator stations are desirably SIS compatible.

Further, in the present embodiment, a link master 105/105' desirably contains the same control capabilities as a link active scheduler 100/100'. Thus, the capabilities of both are discussed further herein with reference to a link master. More particularly, a link master 105/105' incorporates a program interface comprising the following three layers: (1) a physical layer, (2) a communications stack, and (3) a user layer. When SISCs are utilized in field devices, the user layer further includes and utilizes an SISRP or interface, as is discussed in greater detail hereinbelow. Otherwise, SIS and non-SIS compatible components utilize common physical layers, communications stacks and user layers.

Figure 2:
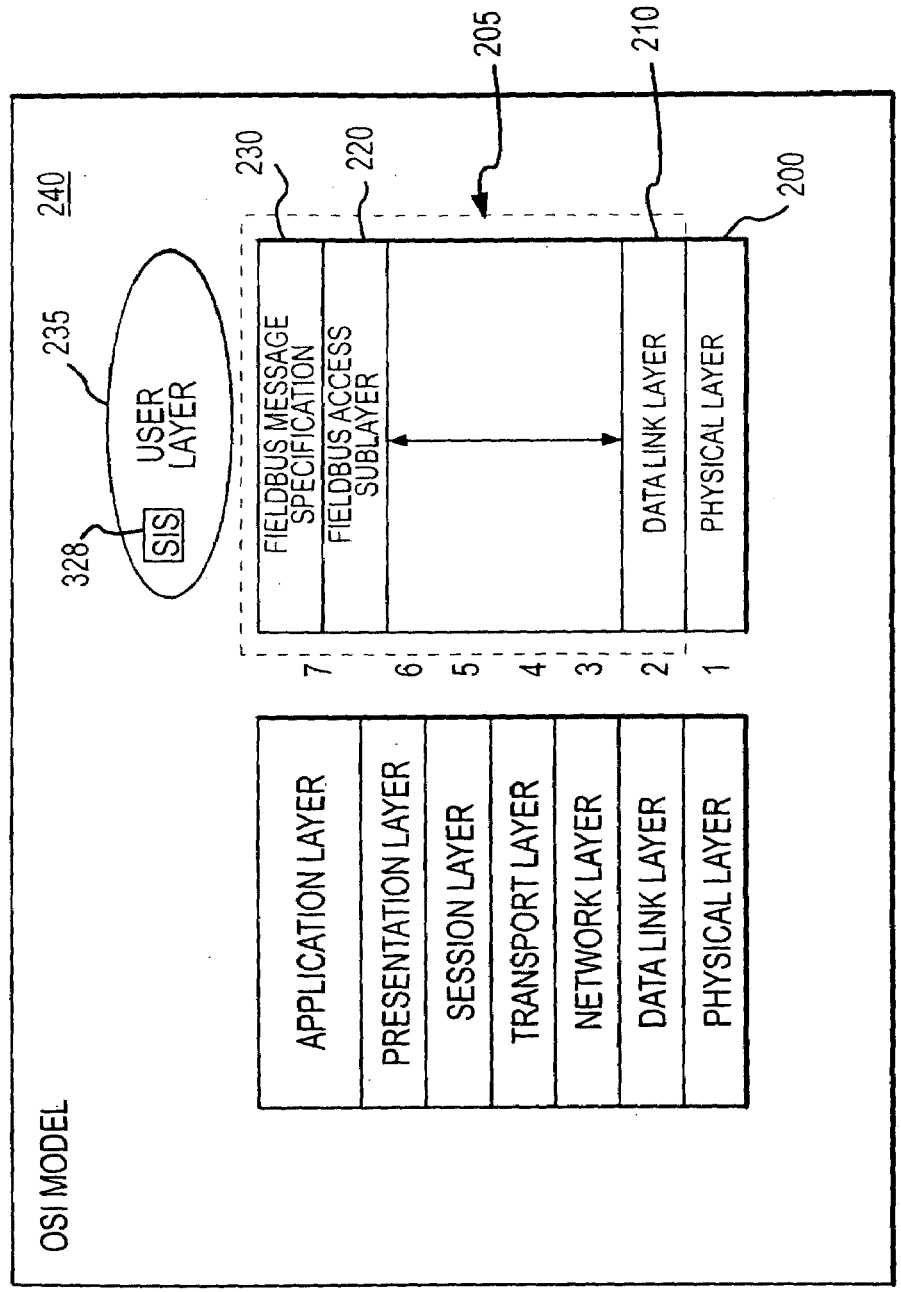
FIG. 2 shows the Open Systems Interconnect layered communication model as compared to the communication model utilized in one embodiment of the present invention.

As shown in FIG. 2, for one embodiment of the present invention, the physical layer (PHY) 200 and the communications stack 205 are derived from the Open Systems Interconnect (OSI) model. The physical layer (PHY) 200 is desirably the same as OSI layer 1, and the communications stack 205 generally corresponds to OSI layers 2 and 7. The user layer 235 is not defined by the OSI model. In alternative embodiments, the physical layer 200 and communications stack 205 may be derived from a variety of different networking standards, such as Transmission Control Protocol/Internet Protocol (TCP/IP), UNIX and others. A detailed description of each of these layers follows. Desirably, for both non-SIS and SIS implementations, the PHY 200 and the communications stack are the same. It is to be appreciated that such commonality in these layers enables SIS devices to be connected to existing fieldbus Architectures without requiring changes to communications protocols currently utilized by non-SIS devices. As such the physical layer 200 and communications stack 205 are described herein with regards to a common or generic (i.e., non-SIS) fieldbus Architecture.

Physical Layer

As shown in FIGS. 1 and 2, the physical layer 200 receives messages from the communication stack 205 and converts the messages into physical signals on the transmission medium 120/120' and vice versa. The physical layer 200 may be defined by approved standards from the International Electrotechnical Commission (IEC) and the International Society of Measurement and Control (ISA). For more information about the physical layer 200, see ISA document S50.02-1992 and IEC document 1158-2, both of which are hereby incorporated by reference in their entirety. It is to be appreciated, however, that the physical layer may also be defined by other standards commonly known in the art.

In the embodiment shown, the messages are encoded using the well known Manchester Biphase-L technique and the clock signal is embedded in the serial data stream. Again, other encoding schemes may be utilized, as desired and/or specified by the implementation and networking standards utilized in any particular embodiment. The hardware required to translate inbound messages from the bus 120/120' and outbound messages from a processor within the device is generally called the medium attachment unit, such as a network adapter. After the physical layer 200 translates an inbound message from the bus 120/120', it forwards it to the communications stack 205. The communication stack 205 is described below.

Communications Stack

FIG. 2 shows a preferred communications stack 205. In this embodiment, the communication stack 205 includes the data link layer 210, the fieldbus access sublayer 220 and the fieldbus message specification 230. Again, these layers (205, 210, 220 and 230) are desirably common to both SISCs and non-SISCs. Also, for at least one embodiment, the data link layer is the same as OSI layer 2, while the fieldbus access sublayer 220 and fieldbus message specification 230 are sublayers within the OSI application layer, OSI layer 7. The communications stack 205 does not use layers 3–6. The layers of the communications stack 205 are described below.

Data Link Layer

The data link layer 210 controls transmission of messages onto the bus 120/120' from a link active scheduler 100/100', link master device 105/105' or basic device 110/110' based on the instructions received from a network controller or the link active scheduler 100/100'. In a preferred embodiment, the data link layer 210 is a subset of the IEC and ISA data link layer standards.

The link active scheduler 100/100' controls the data link layer 210 according to a network schedule stored in a memory. The network schedule is a list of transmit times for data buffers within the system. The data buffers store data collected by the field devices. For example, if the field device is a thermometer, the data buffer stores the temperature, and upon command, publishes the temperature reading onto the bus 120/120'. Additionally, the link active scheduler 100/100' can identify all the field devices operating on the system because it maintains a "live list." The link active scheduler 100/100' maintains the live list by periodically transmitting a pass token message. Any field device properly responding to the pass token is kept on the live list. If a field device fails to respond to the pass token after a predetermined number of attempts, the device is removed from the live list. Since multiple networks may be connected by bridges and otherwise, in one embodiment, each link active schedule 100/100' desirably keeps a "live list" for those components on each respective network.

New devices can also be added to the live list. The link active scheduler 100/100' periodically sends probe node messages to network addresses not listed in the live list. If a field device is present at the network address and receives a probe node message, the field device immediately returns a probe response message. If the field device answers with a probe response message, the link active scheduler 100/100' adds the field device to the live list and confirms the field device's addition by sending the field device a node activation message.

Whenever a field device is added or removed from the live list, the link active scheduler 100/100' broadcasts the changes to the live list to all field devices. This allows each field device to maintain a current copy of the live list.

The link active scheduler 100/100' also schedules the communications from other field devices operating in the system. The link active scheduler 100/100' coordinates the timing of each communication by issuing compel data messages at the scheduled times. Upon receipt of the compel data message, the requested field device broadcasts or publishes its data to the other field devices operating in the system. To assure proper synchronization, the link active scheduler 100/100' also periodically broadcasts a time distribution message on the bus 120/120' so that all field devices have exactly the same data link time. The time distribution message is a message which includes the data link time. The data link time is the system time of the link active scheduler 100/100'. When the time distribution message is received by the link masters 105/105' on a given bus, the link masters 105/105' reset or recalibrate their individual system times to the data link time.

The remaining operations are performed between scheduled messages or data exchanges. The link active scheduler 100/100' grants permission to other field devices to use the bus 120/120' by issuing a pass token message to an individual device. When the individual field device receives the pass token, the field device is allowed to send messages until the field device is finished sending messages or until the maximum token hold time has expired, whichever is shorter. The token hold time is the amount of time the device can send messages after receiving the pass token. This method of control management is commonly called token passing control. A variety of techniques for implementing token passing control are well-known to those skilled in the art.

Figure 3:
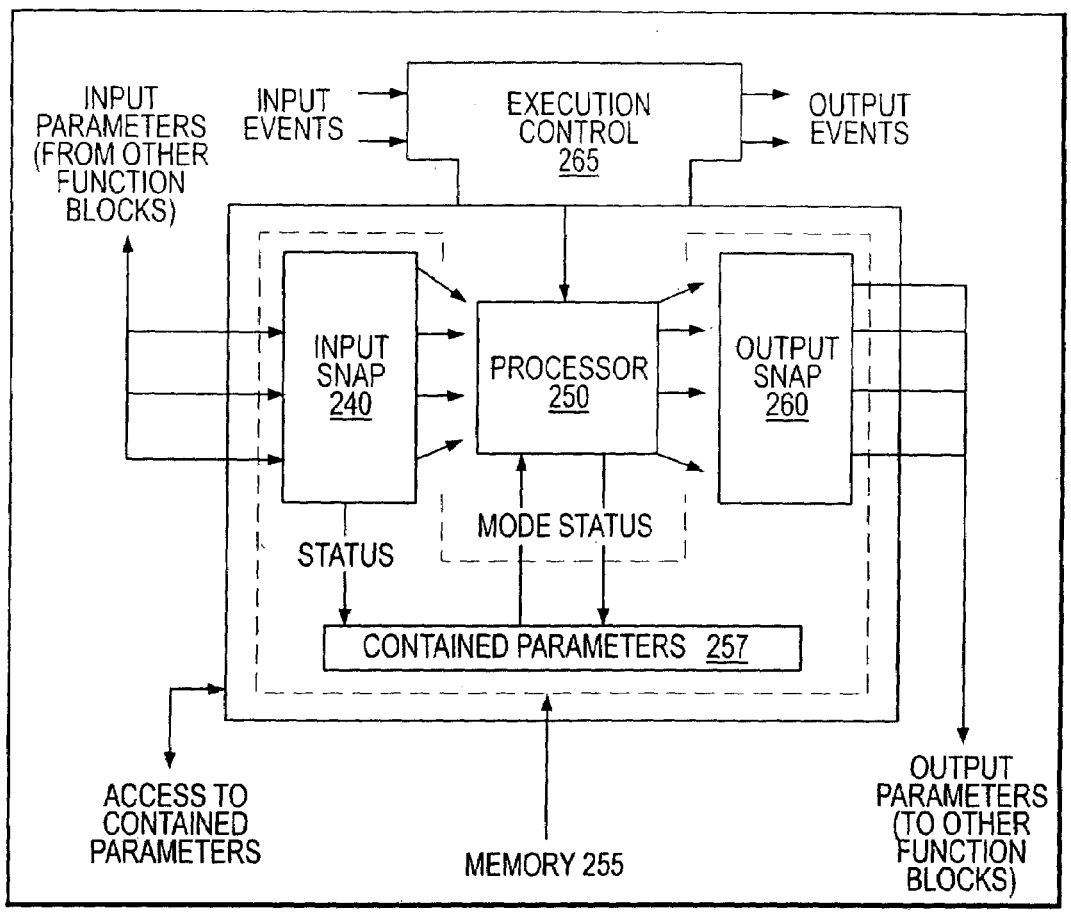
FIG. 3 illustrates a hardware embodiment of a field device.

To control the data exchanges each device/component preferably includes an input snap 240, processor 250, memory 255, contained parameters 257 and output snap 260, and a medium attachment unit 612, as shown in FIGS. 3 and 8. The input snap 240 and output snap 260 protect parameter values from write access or other external interferences during execution of a block. The processor 250 processes the execution of stored blocks as well as the algorithms and programs within the blocks. The snapped parameters and contained parameters 257 are stored in the memory 255. The memory is preferably EEPROM or FLASHROM to permit programming of the device without the danger of losing data due to power loss. In alternative embodiments, the memory 255 may be ROM, RAM, or EPROM.

Fieldbus Access Sub-Layer

Referring again to FIG. 2, the next layer in the communications stack 205 is the fieldbus access sublayer 220. The fieldbus access sublayer 220 uses the scheduled and unscheduled data exchanges of the data link layer 210 to provide a service for a fieldbus message specification 230. Again, this sublayer 220 is desirably the same in both SIS and non-SIS compatible devices. The service provided by the fieldbus access sublayer 220 is the efficient addressing of commonly sent messages. Some examples of fieldbus access sublayer services are called virtual communication relationships (VCRs). FIG. 4 shows three types of VCRs: client/server 251, report distribution 252, and publisher/subscriber 254. Other VCRs may exist, however, in other implementations of the present invention.

The client/server VCRs 251 are used for operator messages, such as the types of messages listed in FIG. 4. Specifically, client/server VCRs 251 are queued, unscheduled, user-initiated, one-to-one communications between field devices and/or components within field devices, including SISCs. Queued means that the messages are sent and received in the order the messages were submitted for transmission without overwriting the previous message. In a preferred embodiment, a field device can send a message requesting a data exchange when the field device receives a pass token message from the link active scheduler 100/100'. The requesting device is called the client. The device that receives the request is called the server. The server responds when it receives a pass token message from the link active scheduler 100/100'. As is discussed in greater detail hereinbelow, when SISCs are involved in client/server data exchanges, additional message and sender verification techniques, such as those set forth in the SISRP, are used to ensure the proper Safety Integrity Level ("SIL") is achieved.

The report distribution VCRs 252 are used for event notification, such as alarm notifications to operator consoles and trend reports. Specifically, the report distribution VCRs are queued, unscheduled, user-initiated, one-to-many communications. The report distribution VCRs 252 allow a device to send a message to a common address, such as "ALL OPERATOR CONSOLES." Desirably, report distribution VCRs for SISCs and non-SISCs are identical. It is to be appreciated that SIL considerations commonly do not arise with respect to reporting events because of the built-in safeguards present in SIL compatible components, namely, their pre-programming to accomplish certain "safety" functions or actions when an erroneous condition is detected.

The publisher/subscriber VCRs 254 are used for publishing data. Specifically, the publisher/subscriber VCRs 254 are buffered, one-to-many communications. Buffered means that only the latest version of the data is maintained within the network. New data overwrites previous data. In the preferred embodiment, a field device publishes or broadcasts messages to other field devices on the bus 120/120' when the field device receives a compel data message from the link active scheduler 100/100'. The publisher/subscriber VCR 254 is used by the field devices for scheduled publishing of user layer function block inputs and outputs. The publishing of user layer function block inputs and outputs is discussed in more detail later. As is discussed in greater detail hereinbelow, when SISCs are involved in publisher/subscriber data exchanges, utilize additional message and publisher verification techniques, such as those provided in the SISRP, are used to ensure the proper Safety Integrity Level ("SIL") is achieved.

Fieldbus Message Specification ("FMS")

Another layer in the communications stack 205 is the fieldbus message specification ("FMS") 230. The FMS 230 allows function block applications to send messages to each other using a standard set of message formats. The FMS 230 describes communication services 270, message formats and protocol behavior needed to build a message for the user layer 240, as illustrated in FIG. 5. In one embodiment of the present invention, the formatting of FMSs is defined by a formal syntax description language called Abstract Syntax Notation 1 developed by International Telegraph and Telephone Consultive Committee. In other embodiments, the format of FMSs are otherwise defined using commonly known message descriptive languages.

Data that is communicated over the bus 120/120' is described by an object description. As illustrated in FIG. 6, object descriptions 280 are collected together in a structure called an object dictionary 281. The object descriptions 280 are identified by an index number 285. An index number is a cross reference to the location where a particular object description is stored in memory. Index zero 287, called the object dictionary header, provides a description of the dictionary itself and defines the first index for the object descriptions of the function block application 440.

In a preferred embodiment, index numbers 1–255 define standard data types, such as Boolean, integer, floating point, bit string, and data structures, that are used to build all other object descriptions 280. The index numbers above index number 255 cross reference user layer object descriptions 280.

The communication services 270, shown in FIG. 5, provide a standardized way for user layers 235/235', both SIS and non-SIS compatible, to communicate over the fieldbus. Some examples of communication services 270 are context management service, object dictionary service, and variable access. In one embodiment, the context management services are used to establish and release virtual communication relationships with a virtual field device. The object dictionary service allows the user layer 235/235' to access and change the object descriptions in a virtual field device. The variable access services allow the user layer 235/235' to access and change variables associated with an object description.

In addition, the communication services 270 allow the fieldbus message specification 230 to communicate with the virtual field devices 310, 400 in the user layer 235/235'. As shown in FIG. 7A, a field device will have at least two virtual field devices, a network and system management virtual field device 310 and a user virtual field device 400.

The network and system management virtual field device 310 typically stores network management data 320 and system management data 330. The network management data includes a network management information base (NMIB) object descriptions portion 322 and a NMIB object data portion 325. The system management data 330 includes a system management information base (SMIB) object descriptions portion 332, and a SMIB object data portion 335. The user virtual field device 400 includes block object data 327 including block object description 326.

The system and network management information base object descriptions 322, 335 describe the system and network format for the system and network management information base object data 325, 332.

In one embodiment, a few standard communication profiles are used to allow field devices to communicate and work together on the same transmission medium 120/120'. The communication profiles preferably used in function block applications 440 are defined dependent on the field devices category or class. Also, to configure and maintain field devices and their function block application, a common file format is recommended.

As shown in FIG. 7B, the combination of the bus 120/120', medium attachment unit 612 (FIGS. 8A and 8B), physical layer 200, data link layer 210 and the communications stack 205 are considered to form a "black channel" (as illustrated by the hashed blocks) 207. The black channel 207 provides for a standardized communications network and interconnections between SISCs and non-SISCs without requiring additions, deletions or modifications to the communications protocols and configurations currently being utilized to support communications between non-SISCs in one or more field devices using a fieldbus Architecture.

User Layer

The user layer 235 processes the information gathered by the field device operating in the system. As shown in FIG. 2, the user layer 235 is an additional layer added to the OSI model. As shown in FIG. 7A, the user layer is generally composed of a network and system management application 430 and at least one function block application 440. Each with its own virtual field device described above.

The function block application 440 defines the field device's functionality. A function block application 440 includes one or more resources 500/500', as shown in FIG. 8A for a field device having one or more non-SISCs and as shown in FIG. 8B for a field device having one ore more SISCs. A field device may contain resources that include SISCs and non-SISCs. A resource 500/500' is a logical subdivision within the software and/or hardware structure of a device. A resource 500/500' has independent control of its operation, and its definition may be modified without affecting related resources.

Additionally, in SIS components, an SIS sublayer, which provides the SISRP, 328, as shown in FIG. 7A, is included in the function block application 440. This sublayer/protocol 328 is discussed in greater detail hereinbelow.

Introduction

As shown in FIGS. 8A and 8B, both non-SISC related resources 500 and SISC related resources 500' are built of blocks and objects, such as: a resource block 510 or SIS resource block ("SISRB") 510', transducer block 520 or SIS transducer block ("SISTB") 520', function block 530 or SIS function block ("SISFB") 530', trend objects 560, view objects 565, link object 570 and/or SIS link object 570', alert objects 585, system time 601, function block schedules 602, and network traffic. Network traffic includes scheduled and unscheduled traffic. In an SIS device, the resource should contain one or more SISFBs and SISTBs. It is to be appreciated that SISRBs, SISTBs and SISFBs are a few examples of SISCs. Additionally, the SIS resource should be designed to detect faults that occur outside of the resource. A brief description of the blocks and objects used in at least one embodiment of the present invention is provided below.

A function block 530 represents the basic automation functions performed by a resource, such as an analog input, analog output, or proportional/derivative (PD), or any other function required for process or manufacturing control devices. Function blocks 530 are designed to be as independent as possible of the specifics of input/output devices and the network.

In SIS devices, the SISFB 530' is commonly limited to publishing data to another SISFB as well as non-SIS function blocks designed for use in process applications. However, an SISFB desirably can only subscribe to data published by another SISFB in order to ensure compliance with a given SIL standard. Each SISFB is desirably identified by a unique profile number. In one embodiment of the present invention, such profile number is specified by the Fieldbus Foundation. Further, an SISFB desirable enables the distribution of SIS control into and among fieldbus components connected to a fieldbus Architecture. In certain preferred embodiments of the present invention, SISFBs are limited to a defined set. One such set of SISFBs may include analog input, analog output, discrete input, discrete output, analog voting, discrete voting, lock change, and logic. Similarly, other embodiments may provide for SISFBs being provided in one or all of three classifications such as input function blocks, output function blocks and control function blocks.

Each function block 530/530' uses input parameters according to a specific algorithm and internal set of contained parameters. Input parameters are structured parameters composed of a value field and a status field. The data type specified for input parameters is dependent on the data type of its value field. The status field is identical for all input parameters. Contained parameters may be used to provide values to the block algorithm. The values of the contained parameters may be set by the manufacturer or as part of the configuration. Generally, the contained parameters may also be set during operation. The input parameters and contained parameters are processed according to the specific algorithm to produce output parameters. The output parameters are available for use within the same function block 530/530' or by other function blocks 530/530'.

Transducer blocks 520/520' can preprocess and post-process data between the function blocks 530/530' and field devices, such as sensors, actuators, and switches. Transducer blocks 520/520' can control access to the input/output devices through a device independent interface used by function blocks 530/530'. Transducer blocks 520/520' can also perform functions, such as calibration and linearization. SISTBs are desirably designated by a unique profile number, such as one assigned by the Fieldbus Foundation. Further, transducer blocks 520 may receive inputs from non-SISFBs and/or SISFBs. However, SISTBs 520' desirably may only receive inputs from other SISCs, such as SISFBs, SIS resource blocks, and/or other SIS compatible blocks.

Also, since an SISFB can not assume that an underlying system management kernel ("SMK") is fault free, since the SMK is part of the black channel, the SISFB may include a parameter which functions as a watchdog timer. Such watchdog timer suitably aids in the detection of errors in the scheduling of blocks, such as errors arising from the black channel erroneously scheduling a function block. In one embodiment, a "period of execution" parameter may be utilized as a watchdog timer. Such parameter desirably may be written by SIS compatible configuration devices. Additionally, each output SISFB desirably monitors its execution and resets the watchdog timer (period of execution parameter) each time the block executes. More particularly, if the watchdog timer expires or is updated at too fast of a rate, desirably all of the outputs for the affected SISC(s) will be set to a safe state. It is to be appreciated that a "safe state" is commonly component and implementation specific.

As further shown in FIGS. 8A and 8B, a resource 500/500' also commonly includes one or more link objects 570/570'. In a non-SIS device, a link object 570 exchanges data between function blocks 530 within a resource 500 or between resources. The data exchanged by the link object 570 can include process data or events. In addition, the link object 570 can exchange trend report data or alert notification data.

In an SIS device, SIS link objects ("SISLO") are utilized. In addition to providing the before mentioned functions and capabilities, SISLOs are enhanced link objects that utilize an extended safety-related protocol, such as the SISRP, which include parameters that specify the mapping between two SISCs, for example, between an SISFB, an SISRB or an SISTB and a host, regardless of whether the SISFBs are located in a host or another field device or component. It is to be appreciated that other mapping between SISFBs, SISTBs, SISRBs, hosts, and non-SISCs may be provided as needed to accomplish particular implementations of the present invention. Such link object mapping parameters enable a subscriber to detect errors that may be induced by an underlying black channel. Desirably, SISCs communicate with each other using the SISRP. The SISRP is described in greater detail hereinbelow.

A resource block 510 makes the hardware specific characteristics of a device accessible to the network. The resource blocks 510 insulate the function blocks 530 from the resource hardware by including a set of implementation independent hardware parameters. However, in components which contain one or more SISCs, the resource block must be an SIS resource block ("SISRB") 510' because, as mentioned above, SISCs preferably are configured to only subscribe to information provided by other SISCs. SISRBs are desirably designated by a unique profile number, such as one assigned by the Fieldbus Foundation. Also, SISRBs desirably include a parameter, for example "SIL_LEVEL_SUPPORTED," that specifies the maximum SIL level of an application in which the component may be utilized.

View objects 565 and trend objects 560 provide efficient access to parameter data within a function block application 440. View objects 565 allow groups of parameters to be accessed by executing a single communication request. Trend objects 560 allow a collection of parameter samples to be reported in a single communications transfer. For at least one embodiment of the present invention, view and trend objects associated with SISCs may be communicated using normal or "SIS" client-server, publisher-subscriber or other communication mechanisms.

Alert objects 585 support the reporting of events to an interface device and other field devices. Upon detection of a significant event, a function block 530/530' may send an alert message using an alert object 585. A significant event is an event that affects system operation. Desirably, the various embodiments of the present invention can report their own errors, alerting operators to problems on a "real-time" basis, as desired. Thus, the various embodiment of the present invention described herein may improve the productivity of any given operation by, desirably, reducing down time, and increasing operator and plant safety.

System time 601 is provided by system management to function block applications (i.e., one or more resources) 440 for use in synchronizing operations between field devices. Each device 100/100', 105/105', 110/110' keeps its own system time 601. Each device 100/100', 105/105', 110/110' uses its system time to control the execution of its internal function blocks. Time stamping of alarms, events, and trend information is based on system time 601 maintained by each device.

System management coordinates the execution of the function blocks 530/530' according to a system schedule. The system schedule is a list of execution times for function blocks within a device. Additionally, the execution of a function block 530/530' may also be invoked by the completion of the execution of another function block 530/530'. System management is described in more detail later.

Application Framework

Once the components (i.e., the blocks and objects) are implemented, they are completed or connected by an application framework. The application framework coordinates the communication between components internally and externally. Internal communication means communication between function blocks 530/530', regardless of whether they are in the same field device. External communication means communication between field devices with function blocks 530/530' and field devices without function blocks. Ideally, the connection of these blocks by the application framework results in a modular system allowing the functionality of an application to be more extensible and portable. The functionality is extensible in the sense additional functionality can easily be added to an existing function or component. The functionality is portable in the sense that functionality can easily be moved from one location, device or component in a system to another or even from one system to another.

FIG. 9 shows some examples of external communications. Specifically, FIG. 9A shows the communication of field devices 620 and a monitor device 650, a temporary device 660, and an interface device 670. Unlike the field device 620, the other devices 650, 660, 670 contain applications which are not implemented as function blocks. The monitor device 650 is connected to the application framework, but does not have a network address. A monitor device monitors communications on the network (e.g., a diagnostic tool may be a monitor device). A temporary device 660 supports diagnostics and adjustment of parameter values. An interface device 670 provides an operator interface, control applications, and/or configuration and diagnostic support.

Similarly, FIG. 9B shows an example of external communications which may be supported between an SIS control subsystem 910, such as one which might exist on bus 120', and a non-SIS control subsystem 920, such as one which might exist on bus 120. In this illustrative example, SIS control subsystem includes two SIS devices, SIS Device A 930 and SIS Device B 940, and non-SIS control subsystem 920 includes two non-SIS devices, Device C 950 and Device D 960. An SIS Application A 970 is implemented between Devices A and B, 930/940, using SISCs. Additionally, a non-SIS Application B 980 is implemented between Devices C and D 950/960, using, among other things, non-SISCs such as standard function blocks, transducer blocks, resource blocks and link objects. Communications between SIS Devices A and B 930/940 and non-SIS Devices C and D 950/960 are also supported using common function, transducer and resource blocks, link objects, view objects, alert objects and otherwise. As mentioned previously above, SIS Device A (or B) may publish information to SIS Device B (or A) and to non-SIS Devices C and D. However, non-SIS Devices may only publish information to non-SIS Devices. Desirably, when an implementation such as the one shown in FIG. 9B is first implemented, SISCs in the fieldbus devices/components are tested and registered with a suitable testing facility, such as one provided by the Fieldbus Foundation, to ensure interoperability between SIS and non-SIS fieldbus devices using standard function blocks and/or SISCs.

Further, write access to SISCs (e.g., SISFBs, SISTBs, and SISRBs) may be restricted to a list of interface devices. The list is desirably pre-configured in the device by a configuration system. The SISCs only grant write access to this list of devices. The write access for SISCs may also be "locked" or similarly configured to prevent the changing of any safety related parameters while the SIS device or SISC is online or in an otherwise undesirable condition (for example, during certain potentially human or equipment hazardous maintenance procedures). Desirably, an alert is generated to an operator whenever a write status is changed. Also, each connection between SISCs is identified by a Connection Key ("CK"). CKs are described in greater detail hereinbelow. Further, the Protocol Data Unit ("PDU") containing the data written or read to a given SISC is enhanced to include an authenticator, such as a Cyclic Redundancy Check ("CRC"). In one embodiment of the present invention, a 32 bit CRC is used to authenticate the validity of data communicated over a black channel by calculating such CRC using the transmitted data, a connection key and other information, as is described in greater detail hereinbelow. CRCs and the calculation of CRCs are well known in the art. Further, it is to be appreciated that CRCs equal to or greater than 32 bits may be utilized in conjunction with the various embodiments of the present invention to authenticate data transfers at SIL 1, SIL 2, SIL 3 and/or higher levels.

CRC-32 may be used various embodiments of the present invention, as discussed in greater detail hereinbelow, to protect against corrupted messages, addressing failures, such as masquerading, and expansion of a message. The CRC-32 may also be utilized, in other embodiments of the invention, to protect other commonly known in the art errors or invalid messaging conditions.

In addition to external and internal interactions, a variety of other possible interactions are well known to one of ordinary skill in the art. For example, there may be interactions with configuration applications, interactions with a human interface application, interactions with other control applications, interactions for the establishment of function block links, interactions with other resources, interactions with system management, and many more.

Function Block Application Structure

As stated above, a function block application 440, for both SIS and non-SIS devices, defines the functionality of the field device, and includes one or more resources 500/500'. A resource is a logical subdivision within the software and/or hardware structure of the device. Although not shown, function block applications 440 are generally implemented using multiple resources. As shown in FIGS. 8A and 8B, the resources 500/500' which make up a function block application 440 may be modeled as a set of SISCs (i.e., blocks or objects) coordinated to execute a related set of operations.

A block is a logical processing unit of software comprising a named copy of the block and parameter data structure specified by function type. A named copy of the block is an encapsulated software processing unit, such as an algorithm or computer program. The block is encapsulated to create a modular system with the flexibility for upgrades or improvements. The software processing unit can include a computer program and parameters. The software unit is designed to be independent of other blocks and perform a function which can be used in many different function block applications.

A block is identifiable by its class or subclass. The class of a block indicates its parameters, and how the parameters affect the execution of the software processing unit. A block class specifies the common attributes shared by all instances of the class, including block elements (e.g., input and output events, contained parameters, and common function) and association with resource function (e.g., alarm notifier and function block services). Each block subclass assumes all the parameters specified by the class, as well as the additional parameters attributed to the subclass.

Block classes are classified as elementary or composite. A composite block class is one whose algorithm requires the invocation of functions and/or component blocks of the composite block. An elementary block has a fixed algorithm and does not require the use of component functions or function blocks. Specific examples of elementary and composite blocks are described in detail later.

Function Block Application Hardware

In the preferred embodiment, each device contains at least one function block application 440. To execute the function block application 440, a device usually contains an input snap 240, processor 250, memory 255, output snap 260, and execution control 265, as shown in FIG. 3, as well as the communications stack 205 and medium attachment unit 612, as shown in FIGS. 8A and 8B.

The medium attachment unit 612, such as a network adapter, receives signals from other devices over the transmission medium 120/120' and translates the signals into a message for the processor 250. For example, the medium attachment unit 612 converts or translates a message from the processor 250 into a signal for transmission over the transmission medium 120/120', or a signal from the transmission medium 120/120' into a message for the processor 250.

The input snap 240, processor 250, memory 255, and output snap 260 are for executing the transducer blocks, function blocks, and resource block within a function block application. Specifically, the input snap 240 receives and holds input parameters. These input parameters may be constant or received from other function blocks. The processor 250 executes or processes a software program or algorithm based on these input parameters and any contained or stored parameters. These parameters are discussed in more detail below. The processor 250 is preferably a microprocessor or programmable logic array. Any software programs or parameters used by the processor 250 are stored in the memory 255, which is preferably EEPROM or FLASHROM. The functionality of the function block application 440 is only limited by the size of the memory 255 and the processing speed of the processor 250. The output of the processor 250 is then sent to an output snap 260.

The input snap 240 and output snap 260 are responsible for protecting parameter values from external interferences, such as write access, while the processor 250 is executing. In other words, once the processor 250 begins processing the inputs, the input snap 240 and output snap 260 hold the inputs and outputs constant until the processing is complete.

Parameters

Parameters define the inputs, outputs, and data used to control block operation. The parameters are accessible over the network.

An input parameter obtains its value from a source external to the block. An input parameter may be linked to an output parameter of another block within its resource 500/500' or within another device. An input parameter is an input variable or constant which is processed by the algorithm or program of a function block 530/530'.

An output parameter is a parameter which may be linked to an input parameter of one or more blocks. Output parameters contain both value and status attributes. The output status attribute indicates the quality of the parameter value generated.

A contained parameter is a parameter whose value is configured, calculated, or set by an operator or higher level device. In the preferred embodiment, a contained parameter cannot be linked to another function block input or output, and therefore may not contain status attribute.

Parameter Identifiers

Each parameter is characterized by its identifiers, storage, usage, and relationship to other parameters. Each parameter can be characterized by more than one identifier. For example, a parameter within a block is uniquely identified by its parameter device identification, and a parameter within a system is uniquely identified by its device identification and tag. Tags provide a unique symbolic reference to each block within the system.

The data type for a parameter is specified by its data type index. The data type index is the object dictionary index of the data type. The data type index specifies the machine independent syntax of the parameter. Preferably, the machine independent syntax of the parameter is an abstract syntax. The user layer 235 encodes/decodes the data according to the transfer syntax rules in the fieldbus message specification 230. Additionally, a variety of other parameters may also be stored in the object dictionary 281 and referenced by its object dictionary index number.

Parameter Storage

Parameter attributes may be classified as dynamic, static, or nonvolatile. Dynamic parameters are values calculated by the block algorithm and, therefore, do not need to be restored after power failure.

Static attributes are a specific, configured value that must be restored after a power failure. An interface device 670 or temporary device 660 may write to static parameter attributes on an infrequent basis. Static parameter attributes can be tracked by a configuration device.

Non-volatile parameter attributes are written on a frequent basis and the last saved value must be restored by a device after power failure. Since the values of these parameter attributes are constantly changing, the values can be tracked by a configuration device.

Parameter Relationships

The execution of a block involves input parameters, output parameters, contain parameters, and the algorithm or computer program stored within the block. The execution time for a block's algorithm is defined as an attribute of the block. The length of execution time is dependent on the hardware and software implementation.

In simple blocks, input parameters are received before block execution. When the block begins execution, the input values are snapped to prevent them from being updated while they are used by the algorithm.

However, before these input parameters are processed, the input parameters are used to determine if the algorithm can achieve the desired mode. In a preferred embodiment, a function block application can achieve a variety of modes, such as out of service (O/S), initialization manual (IMan), local override (LO) manual (Man), automatic (Auto), cascade (Cas), remote-cascade (RCas) and remote output ROut) mode. The out of service, initialization manual, and local override modes are described below. For SISFBs, desirably, input function blocks, such as analog input or discrete input, support modes O/S and Auto. Similarly, for output function blocks, modes O/S, Cas and LO are desirably supported.

When a block is in OS mode, the block is not being evaluated, and the output is maintained at the last value.

When a block is in the IMan mode, the block output is being set in response to the back calculation input parameter status. When the status indicates there is no path to the final output element, then the control blocks initialize to provide for bumpless transfer when the condition clears. A back-calculation output parameter is supported by all output and control class function blocks. The set point may be maintained or, optionally, initialized to the process variable parameter value.

The LO mode applies to control and output blocks that support a track input parameter. The LO mode may be enabled by a local lock-out switch on the device or a variety of other ways. In the LO mode, the block output is being set to track the value of the track input parameter. The set point may be maintained or, optionally, be initialized to the process variable parameter value.

The determination of whether the block is able to achieve the desired mode is made by comparing the actual mode attribute and the target mode attribute. The actual mode attribute reflects the mode of operation which the block is able to achieve. The target mode attribute indicates what mode of operation is desired for the block. The target mode is usually set by a control application or by an operator through a human interface application.

Once the actual mode is determined, the block execution progresses and the outputs are generated. If alert conditions are detected, alarm and event output parameters are updated for reporting by an alert object. When the execution is complete, the outputs are snapped making them available for external access. Prior to being snapped, only the previous values are available for external access.

Resource Components

As stated above, a function block application 440 contains one or more resources, and a resource 500/500' includes one or more blocks. A block is identifiable by its class or subclass. The class of a block indicates its parameters, and how these parameters affect the execution of its algorithm or program. The Resource Components Section provides the formal models for the preferred classes. Preferred classes include a resource class, directory object class, block object class, parameter object class, link object class, alert object class, trend object class, view object class, domain object class, program invocation object class, and an action object class. In alternative embodiments, someone skilled in the art could define a system with more, less, or different classes. Again, domain object, program-invocation objects and action objects are not supported in SISC.

Resource Class

The resource class defined in a preferred embodiment specifies the descriptive attributes of the resource. The object dictionary of each resource contains a description of the components contained within the resource. The resource class includes the following attributes: resource name, vendor name, model name, revision, logical status, physical status, object dictionary and, in SIS devices, the SIL level supported by the device.

The vendor name identifies the vendor of the software and/or hardware associated with the resource. The model name specifies the model of the software and/or hardware associated with the resource. The revision attribute is the revision level of the software and/or hardware associated with the resource. The logical status attribute contains information about the communication functionality associated with the resource. The physical status attribute gives a coarse summary of the hardware component associated with the resource. The object dictionary contains the attributes of an object dictionary directory object, resource block, and other objects specific to the function block application 440 process. Each of these attributes are accessible through the fieldbus message specification 230.

Someone skilled in the art will recognize these attributes and the attributes defined for any class or subclass are only illustrative of the attributes that could be used. In alternative embodiments, the resource class or any other class or subclass could include more, less, or different attributes. This concept applies to all of the classes and subclasses described in this specification.

Directory Object

Another preferred class is the directory object class. A directory object acts as a guide to other blocks and objects within a resource or function block application 440. The directory object contains a list of references to the other blocks and objects making up a resource or function block application 440. This information may be read by an interface device or temporary device desiring to access objects in the object dictionary. The directory object class is defined as including the following attributes: member identification; starting index of the static object dictionary; data type; sub-index entries; data length; usage; storage; list of valid values; initial value; and item identification.

The member identification attribute is the unique number which identifies the function of the directory. The index is the index of the directory object in the object dictionary. The various data types include meta type or type name. Meta type indicates the object type. Type name specifies the name of the data type of the object. The sub index entries allow the attributes of a directory object to be accessed individually through the read and write service. The data length attribute specifies the number of bytes reserved to represent the sub index values in the directory. The usage attribute indicates that this is a contained object and may not be referenced by link objects for connection to function block parameters. The storage attribute indicates whether the parameter is stored in static memory. The list of valid values specifies the values permitted for the sub index attributes of the directory object. The initial value specifies the initial value assigned to the sub index attributes of the object directory, and the item identification identifies the description of the object.

Block Object

The block object preferred class specifies the characteristics common to the function blocks, transducer blocks, and resource blocks. In the object dictionary, parameters follow continuously after the block object, each having an index. The block object class is defined by the following attributes: member identification; block index; data type; sub index; data length; usage; storage; list of parameters; list of valid values; and item identification. The member identification identifies the function of the block. The block index is the index of the block object in the object dictionary. The data type includes the meta type and type name. The meta type indicates the object type. The type name specifies the name of the data structure of the block. The sub index includes attributes, such as block tag, member identification, item identification, revision, profile, profile revision, execution time, period of execution, number of parameters, next block to execute, starting views, number of view 3 objects, and number of view 4 objects. The data length attribute equals 62. The list of parameters includes static revision, tag description, strategy, alert key, mode, and block error. The remaining attributes were described above.

The three sub-classes of the block object class used in a preferred embodiment are resource block objects, transducer block objects, and function block objects.

Resource Block Object

The resource block object defines hardware specific characteristics of its associated resource. Because the resource block object is a sub-class of the block object model, the resource block object assumes the list of parameters attributed to the block object, as well as its own additional attributes. The additional attributes in the resource block subclass are: resource state, test, resource, additional contained parameters; execution time=0, period of execution=0, and the next block to execute=0.

A resource block insulates the function blocks from the physical hardware by containing a set of implementation independent hardware parameters. The resource block is manufacturer specific; and all its parameters are defined as contained.

Transducer Block Objects

Another subclass of the block object class is a transducer block object. Transducer blocks are defined to decouple function blocks from the local I/O functions required to read sensor hardware and command hardware. This permits the transducer block to execute as frequently as necessary to obtain data from sensors without burdening the function blocks that use the data. It also insulates the function block from the manufacturer specific characteristics of an I/O device.

The transducer block object is a subclass of the block object, and thus, it assumes all the attributes of the block class. The additional attributes of the transducer block subclass are: additional contained parameters; execution time=0; period of execution=0; and next block to execute=0.

Function Blocks Objects

Function blocks represent the basic automation functions performed by a resource, such as an analog input or discrete output. Function blocks are the primary means of defining monitoring and control in a function block application. They are designed to be as independent as possible of the specifics of I/O devices and the network. They work by processing input parameters and inputs from transducer blocks (or other function blocks) according to a specified algorithm and an internal set of contained parameters. They also produce output parameters and output to transducer blocks or the input of other function blocks.

Based on the processing algorithm, a desired monitoring, calculation or control function may be provided. The results from function block execution may be reflected in the output to a transducer block or to one or more output parameters that may be linked to other function blocks or directly to the device hardware.

Function blocks are a subclass of the object class. The additional attributes defined in the function block subclass are the sub-index of execution time, period execution, number of parameters, next block to execute, and additional parameters.

The sub-index attribute defines the attributes of an object which may be individually accessed through read and write services by using the sub-index number with the object index number. Sub-index numbers are defined based on Meta type.

The execution time parameter of the function block object denotes the time required for a function block to execute. The execution time may be divided into three components: pre-processing (i.e., snap of parameter values); execution; and post-processing (i.e., block output values, alarm, and associated trend parameters are updated).

To provide consistent behavior, the block algorithm executed during the execution component is broken down into the following steps. First, the algorithm determines the actual mode attribute of the mode parameter. This calculation will be based on the target mode and the status of attributes of the inputs as described above. Second, the algorithm calculates the set point, if the set point is defined for the function block. The calculation of the set point will be based on the actual mode, set point input parameters, such as cascade and remote-cascade, and any backward path input status. Also, the value of the controlled parameter, process variable, may be used for set point tracking. The resulting set point is shown in a set point parameter. An example of a set point is the temperature setting of a thermostat (e.g., 72°). In other examples, the set point will change frequently.

Third, the algorithm executes control or calculation of the algorithm to determine the value and status of the output parameters. The conditions which determine the status attribute of output parameters. The value attributes of the block's input parameters and contained parameters, the actual mode, and the working set point are used in this algorithm. Generally, the calculation of actual mode and the use of actual mode in the algorithm account for the status of critical inputs.

Fourth, the execution phase calculates the output parameters. This step applies only to output blocks, control blocks, and calculation blocks designed to be used in the cascade path.

The period of execution of a function block is typically scheduled on a periodic basis. The period of execution is user specified based on control or monitoring requirements specific to an application. The system management services coordinate the function block execution. The management information base, which includes the system schedule, is stored in its own resource in the device. The function block period of execution is specified for a block in data link layer time. Through the scheduling capability provided by system management, it is possible to phase or stagger the execution of blocks in a device where their periods of execution time are the same or are integer multiples of each other. System management is discussed in more detail below.

The "number of parameters" attribute within the function block object is the total number of parameter objects associated with the function block, including the block object.

The "next block to execute" attribute of the function block object specifies the next function block within a device to execute to achieve minimum delay in execution within a device. If there is no next function block, then the next block to execute is zero. Thus, where multiple function blocks need to execute in series within a device, a user can specify the first function block to execute in the chain. Through the next block to execute attribute, the order of execution can be predetermined.

The "list of parameters" attribute of the function block object lists the input, output and contained parameters within a function block.

Based on the common parameters and the behavior, a preferred embodiment also defines the following subclasses of the function block subclass, including: input function block; output function block; control function block; and calculation function block.

The input function block subclass receives physical measurements or values from transducer block. The input function block subclass includes a simulation parameter by which the transducer value and status may be over-ridden. The input function block's other parameters preferably include: process variable; primary output; channel number; and additional parameters.

The output function block subclass acts upon input from other function blocks and forwards its results to an output transducer block. The output function block subclass supports the back-calculation output parameter and simulate parameter. The additional output function block attributes are: set point, simulate parameter, cascade input; back-calculation output; remote cascade in; remote cascade out; and channel number.

The control function block subclass acts upon inputs from other function blocks to produce values that are sent to other control or output function blocks. The additional attributes for the control function block are: primary output; back-calculation; process variable; set point; primary input; cascade input; remote-cascade in; remote-output in; back-calculation output; remote-cascade out; remote-output out; and additional parameters. The additional calculation function block parameters are: back calculation input; back calculation output; and additional parameters.

Parameter Objects

Returning to the class level, parameter objects are defined to allow the function block, transducer block and resource block attributes to be accessed over the bus. The attributes defined in the basic parameter object model are: member identification; parameter index; relative index; data type; sub index; data length; units; usage; storage; list of valid values; initial value; and item identification. Not all the parameters listed are required in a particular block. Additionally, a preferred embodiment also defines several subclasses from the parameter object class, including output parameter objects, input parameter objects, and contained parameter objects.

Link Objects

Link objects 570/570' provide mapping between resources and the information exchanged via a communication network as illustrated in FIGS. 8A and 8B. Process data and events to be exchanged between function blocks within a resource or between resources may be defined through link objects. In addition, the communication exchange for support of trends and alerts may be defined using link objects.

Link objects 570/570' are defined in field devices associated with the function block applications process. Link objects 570/570', by referencing the appropriate VCR, may be used to access, distribute or exchange individual objects. In addition, the link objects define the association between input and output parameters, and trend reports, which interface devices must receive.

In SIS implementations, an extended safety/SISRP is utilized. The SISRP provides for authentication of communications between SISCs such that SIL-3 and SIL-2 certifications may be attained. In particular, the SISRP protects against errors that may arise during use of the black channel. Such errors may include: transmission bit failure, such as when a single or multiple bit(s) in a message changes state on the black channel; retransmission, where the black channel inadvertently retransmits a message; omission, where the black channel loses a message(s); insertion/expansion, where a message is erroneously generated and/or inserted or expanded on the black channel; wrong order, where the black channel delivers messages in the wrong order; delay, where the black channel delay transmission or reception of a message for a period of time; masquerading, where the black channel delivers messages to the wrong endpoint or multiple devices have the same network address; queuing fault, where the black channel delays a message by more than the transmission rate but less than the time delay needed to cause a timeout; communication and function block scheduling errors; system and configuration management errors; and others.

One mechanism by which the SISRP protects against the before mentioned errors is by utilizing a sequence number. Desirably, a sixteen (16) bit number is utilized for each VCR connection to identify a sequence of messages sent between a sending SISC and a receiving SISC. The receiving SISC maintains a corresponding index number. When operating properly, the index number updates at both the sender and receiver with each message sent. When the maximum number of messages is received, the numbers wrap and begin counting up from zero (0) again. Assuming a message transmission rate of a message every ten milliseconds, which is achievable using a High Speed Ethernet connection, the sequence numbers should wrap every 655 seconds. At lower message transmission rates, the sequence numbers will wrap less often.

If the sent sequence number and the expected sequence number (i.e., the sequence number expected at the receiving component) do not match, then the data is considered "stale" or unusable. If such a stale data condition repeats itself a given, configurable, number of times, then a link between the components may be set as being bad. Such sequence numbers and the link, generally, will then need to be reset before communications between the effected components are resumed. Further, in a publisher-subscriber relationship, the sequence number desirably is reset on both the sender and the receiver whenever two correct consecutive messages have been received. For a client-server relationship, if the sequence numbers are out of synch, then the connection is aborted and the sequence numbers are reset upon the connection being reestablished. However, in other embodiments, sequence numbers may be reset using other processes and techniques.

Further, by utilizing a sequence number in the SISRP, protection is provided for retransmission, wrong order and insertion/expansion errors. Additionally, sequence keys are also used in conjunction with CKs in the SISRP to protect against masquerading errors.

As mentioned above for SIS implementations, connection keys ("CKs") are desirably utilized. Such CKs are a part of the SISRP and are commonly provided as a parameter in SISLOs. The CK is a unique key that is assigned by a configuration system for connection between an interface device and SISCs (i.e., SISFBs, SISTBs and SISRBs) for client-server connection. Also, a unique CK is assigned for each publisher-subscriber connection, wherein all subscribers to a given publisher are desirably configured to use the publisher's key. The utilization of CKs and sequence numbers in client-server and publisher-subscriber connections is further described in greater detail hereinbelow.

Also, for SIS implementations the SISLOs preferably include an SIS Access parameter. This parameter, when set, specifies that read and write requests are processed using the extended SISRP.

Alert Objects

Alert objects are used to communicate notification messages when alarms or events are detected. An event is an instantaneous occurrence that is significant to scheduling block execution and to the operational view of a function block application 440. An alarm is the detection of a block leaving a particular state. The alert object class allows alarms and events to be reported to a device responsible for alarm management.

Based on the type of alarm and event information which may be reported by blocks, the preferred embodiment designates three subclasses of alert objects. They are analog alerts, discrete alerts, and update alerts. Analog alerts are used to report alarms or events whose values are associated with a floating point. Discrete alerts are used to report alarms or events whose associated value is discrete. Update alerts are used to report a change in the static data of a block.

Trend Objects

Trend objects support management and control of function blocks by providing visibility into history information for reviewing their behavior. Based on the type of information collected, a preferred embodiment defines three subclasses of trend objects. These subclasses are the trend float subclass, the trend discrete subclass, and the trend bit string subclass. The trend float class collects the values and status of floating point input and output parameters. The trend discrete subclass collects the values and status of discrete input and output parameters. The trend bit string subclass collects the values and status of bit string input and output parameters.

View Objects

View objects support management and control of function blocks by providing "visibility" into their configuration and operation. In other words, view objects allow the user to monitor or "view" data associated with operation, diagnostic, and configuration of the system, functions block application 440 or resource 500. In one embodiment of the present invention, there are four sub-classes of the view object class. These subclasses are view 1, view 2, view 3, and view 4. View 1 allows access to dynamic operation parameter values. View 2 allows access to static operation parameter values. View 3 allows access to all dynamic parameter values. View 4 allows access to other static parameter values.

Domain Objects

For a non-SIS device, a domain object 580 supports download services that may be used to load data from a client into the server's domain. Data from the server's domain may be transmitted to a client through domain upload services. The domain objects are part of memory. They may contain programs or data. Domains with code and data are combined into an executable program using a program invocation object.

Other Objects

For a non-SIS device, a program invocation object 590 provides services to link domains to a program, to start this program, to stop, and to delete it. Action objects may optionally be supported by a resource in a non-SIS device. Through an action object, an individual block or object within a resource may be deleted in the non-SIS device. Preferably, for SIS devices, action objects are not supported because it is commonly undesirable to delete safety critical or important blocks or objects.

Function Block—Mapping

For implementation of a function block application 440, the function block application 440 is mapped into the virtual field device of the fieldbus message specification 230, as shown in FIG. 7A. The virtual field objects which are the preferred tools in describing a function block application 440 are: variable objects; event management objects; domain objects (in non-SIS devices only); and program invocation objects (in non-SIS devices only).

Variable objects are a type of block parameter. Other types of block parameters are simple, array, or record. Record objects support trend, action, and link objects. Grouping of information for access may be done using variable list objects.

Event notification objects are used for alarm and event notification. Domain objects, which preferably are not available in SIS devices, are a computer program that may be loaded into memory using the domain download services. Program invocation services, which preferably are not available in SIS devices, may control function block application initialization. Such services include: to start, to stop, and to reset.

The table below is used to show how the function block application model may be mapped directly into the objects defined in the object dictionary.

| Function Block Model | | Mapping to FMS | |
|---|---|---|---|
| Resource | | VFD | |
| Directory | | Directory Object | Array |
| Block | | Record | |
| | Parameters | | Simple Variables, Array & Records |
| | Views | | Variable Lists |
| Link Object | | Record | |
| Alert Object | | Event | |
| Trend Object | | Record | |
| Program Invocation | | Program Invocation | |
| Domain | | Domain | |
| Action | | Record | |

In a perferred embodiment, to coordinate the mapping of the function block models into the object dictionary, the device description language (described in more detail later) is used to describe the function block and support block parameters used by the configuration tool. Such a description is known as a "device description." In many cases, the "device description" is used in the configuration and interface stations. However, in some cases, all or part of the device description may be stored in the field device. When the device description is stored in the field device, it may reside in its own object dictionary in a resource separate from that used for the function block application. To access the device description information, each block maintains an associated device description reference number.

The virtual field device collects the blocks and objects discussed above into an object dictionary. Within the object dictionary, each block or object is addressed by an index number and identified by an object description. The object descriptions generally contain an index, object code, further object attributes, and system-specific references to the real object.

Index Numbers

In a preferred embodiment, the index numbers are grouped according to their data type or structure, or whether the object is static or dynamic. In the preferred embodiment, object indices 1–255 are reserved for commonly used data types and data structures. As shown in the table below, indices 1–14 and 21 are defined data types in the fieldbus message specification 230, and indices 64–86 are commonly used data structures, which are referenced in the definition of record objects. These indices are the same as the index numbers 285 shown in FIG. 6. FIG. 10 illustrates how these index numbers can also be grouped by whether the object is static or dynamic.

| Index | Type | Nam |
|---|---|---|
| 1 | Data | Boolean |
| 2 | Data | Integer 8 |
| 3 | Data | Integer 16 |
| 4 | Data | Integer 32 |
| 5 | Data | Unsigned 8 |
| 6 | Data | Unsigned 16 |
| 7 | Data | Unsigned 32 |
| 8 | Data | Floating Point |
| 9 | Data | Visible String |
| 10 | Data | Octet String |
| 11 | Data | Date |
| 12 | Data | Time of Day |
| 13 | Data | Time Difference |
| 14 | Data | Bit String |
| 21 | Data | Time Value |
| 64 | Structure | Block |
| 65 | Structure | Value & Status - Float |
| 66 | Structure | Value & Status - Discrete |
| 67 | Structure | Value & Status - BitString |
| 68 | Structure | Scaling |
| 69 | Structure | Mode |
| 70 | Structure | Access Permissions |
| 71 | Structure | Alarm-Float |
| 72 | Structure | Alarm-Discrete |
| 73 | Structure | Event-Update |
| 74 | Structure | Alarm-Summary |
| 75 | Structure | Alert-Analog |
| 76 | Structure | Alert-Discrete |
| 77 | Structure | Alert-Update |
| 78 | Structure | Trend-Float |
| 79 | Structure | Trend-Discrete |
| 80 | Structure | Trend-BitString |
| 81 | Structure | FB Link |
| 82 | Structure | Simulate-Float |
| 83 | Structure | Simulate-Discrete |
| 84 | Structure | Simulate-BitString |
| 85 | Structure | Test |
| 86 | Structure | Action-Instantiate/Delete |

All the object descriptions in the object dictionary other than the data type and data structure descriptions may support extensions. For example, the index number of an object description other than a data type or structure may be changed without affecting the other objects. In addition, the object description may also be improved or upgraded without affecting the other objects.

Object Dictionary

The object dictionary is defined to act as a guide to the information within a function block application 440. The object dictionary 281 is a list of references to the objects making up that function block application. This information may be read by an interface device desiring to access objects in the object dictionary.

The object dictionary directory object 282 will be defined as the first index in the static object dictionary (S-OD) 700, shown in FIG. 10. The starting point of the static object dictionary is defined by the object dictionary object description, which resides in Index Zero. In addition, the object dictionary description identifies the start index, the length of the dynamic list of variable list (DV-OD) 710 and the dynamic list of program invocation (DP-OD) 720 associated with view objects and program invocation objects.

In a preferred embodiment, the directory is logically constructed by concatenating the directory objects, and consists of a header followed by the directory entries. An array offset is specified from the start of the logical directory. The logical directory can be thought of as a single array composed of all the directory object instances. The header is only present in the first directory object.

The blocks which reside in a resource are identified in the object dictionary by the directory object. Each instance of a resource block 510, function block 530, or transducer block 520 consists of a block object and associated parameters. The block object references its associated view object 565.

The block object is the primary key used in referencing an instance of a block. It identifies the block tag, execution time, profile, and number of block parameters. Also, it identifies the starting location and number of view objects for this block. The parameters of a block are located continuously in the object dictionary following the block object. The block parameter values may be accessed through these parameter objects. In a preferred embodiment, the block parameter objects are generally restricted to simple variable parameters, array parameters and record parameters.

In a preferred embodiment, several data structures have been standardized for the function block application process.

Common Sub-Functions

This section contains descriptions of sub-functions common to many blocks. A process control function has the following elements: (1) one or more inputs; (2) one or more outputs; (3) scaling information; (4) a mode selector; (5) a selected algorithm; (6) a set of visible data parameters; and (7) a set of internal data. Each of these elements represents either static data or dynamic data. Static data is data which is seldom changed, while dynamic data may change with each block evaluation.

Each instance of a block is processed according to the algorithm selection at a time determined by a combined block execution and communication scheduler. The only scheduling information contained in the parameters of a block is the period of execution and the maximum execution time.

Connections

A block input contains the data read from outputs of other blocks. If a block does not receive an input from another block, a constant input can be entered. The permanence of the value depends on the kind of memory to store it. The type of memory used depends on the parameters. For example, volatile memory is sufficient for a frequently changing parameter. Nonvolatile memory is preferred for set points. Block outputs contain the result of block evaluation, or an operator entry if the mode is manual.

Both inputs and outputs comprise a value field and a status field. The status field contains quality, substatus, and limit attributes. It is the same for all inputs and outputs.

The input and output function block classes must exchange data with the device hardware and this is completely under the control of the manufacturer who writes the device code, as this data never goes through the communication system. In the alternative embodiments, many blocks provide parameters which may be written and read by remote devices operating a proprietary control application. To conduct such an exchange, the remote device must execute a handshaking utilization algorithm before writing or the block may ignore the input.

Simulation

In a preferred embodiment, all input and output class function blocks have a simulation parameter, which has a pair of status values, and an enable switch. This parameter acts as a switch at the interface between a function block and the associated transducer block or hardware channel. For inputs, the transducer value and status are received from the transducer block or hardware channel if the switch is disabled. When the enable switch is on, the simulation parameter and status values are received from the function block, and the transducer block or input channel is ignored.

For outputs, the simulate value and the status value become the readback value and status when the enable switch is on, and the transducer switch is ignored.

Scaling information is used for two purposes. Display devices use the range for bar graphs and trending. Control blocks use the range as percent of span, so that the tuning constant remains dimensionless.

Further in SISCs, when the write lock in a resource is activated, simulation capabilities are desirably disabled.

Modes

In a preferred embodiment, all blocks have a mode parameter which determines the resource of the data to be used for the block's input and output. All blocks must permit the out-of-service (O/S) mode. To be useful, a block must support at least one other mode.

The permitted modes apply to the target mode. A write request to the target mode is rejected if it does not match the permitted list. A configuration device must not allow a mode to be permitted that is not supported. The actual mode is not constrained by the permitted mode, because some modes are acquired for initialization.

Parameter Access Table

In a preferred embodiment, there is an access table for each block. The purpose of that table is to define the relative position of the parameters within each block, and to define the contents of the standard views of the parameters.

The block parameters which need to be communicated over the bus vary within the application. To allow communications among the various function blocks, predefined sets of variables are selected for each function block. The parameters included in these predefined sets of function blocks are specified in the views in the parameter access table. If parameters are added to a block, these parameters are added after all the standard parameters.

The parameter access table provides the following: (1) the order in which the parameters appear sequentially in the object dictionary relative to the location of the associated block object; (2) a list of parameters associated with the function block address in the table; and (3) predefined parameter sets. The predefined parameter sets include view 1 through view 4.

View 1 is the operation dynamic parameter set. The operation dynamic parameter set includes information required by a plant operator to view process control, see alarm conditions, and adjust operating targets.

View 2 is the operation static parameter set. The operation static parameter set includes information which may be required for display to an operator with dynamic information. This information is read once when the associated display is first caught up, and refreshed if the static update code changes.

View 3 is the all dynamic parameter set. The all dynamic parameter set includes information which is changing in value and may need to be referenced in a detailed display.

View 4 is the static parameter set. The static parameter set includes information which is normally referenced during the configuration or maintenance and has a specific value unless changed by an operator or instrument technician.

The parameters associated with each block are listed in separate access tables. The first six indices are identical, which forms a standard header for all standard and extended function blocks. The remaining indices are for the core parameters of the function and the lesser used parameters. Finally, there are the parameters required for alarm processing, followed by the alarm records.

Other Common Sub-Functions

In addition to the common functions discussed above, there are many others. In a preferred embodiment, these other subfunctions include: status; back calculation (BK-CAL); cascade (CAS); output tracking (TRK); balancing bias or ratio (BIAS or SP); fail safe handling (FSAFE); bad cascade status handling; invalid values; parameters; alarms; and initialization and restart.

Preferred Resource Components

As discussed above, a device includes one or more function block applications 440. A function block application 440 includes one or more resources 500/500', and a resource 500/500' includes one or more blocks/objects. Each resource has a resource block.

In a preferred embodiment, each resource block contains data that is specific to the hardware that is associated with the resource. The data in the resource block is modeled as contained parameters, so there are no links to this block.

Each function block application also contains at least one function block. In a preferred embodiment, there are ten function blocks which, when combined, can provide the vast majority of functions for manufacturing equipment on a process control system. These blocks are: analog input; analog output; bias; control selector; discrete input; discrete output; manual loader; proportional/derivative; proportional/integral/derivative; and ratio. In SIS devices, some but generally not all of these types of function blocks may or may not be supported. In one particular embodiment of the present invention, available SISFBs are limited to analog input, analog output, discrete input, and discrete output. In other embodiments, analog voting, digital voting and other function blocks may be supported. Thus, it is to be appreciated that the various implementations of the various embodiments of the present invention may include some, all, none or others of the above identified function blocks, some of such function blocks may be SISFBs or non-SISFBs.

In addition, in one embodiment, there are nineteen standardized function blocks to perform more complex functions, including advanced control blocks, calculation blocks, and auxiliary blocks. These nineteen function blocks are: pulse input; complex analog output; complex discrete output; step output proportional/integral/derivative; device control; set point ramp generator; splitter; input selector; signal characterizer; lead lag; dead time; arithmetic; calculate; integrator; timer; analog alarm; discrete alarm; analog human interface; and discrete human interface. These blocks address additional requirements for both a low and high speed fieldbus.

In a preferred embodiment, there are also standard transducer blocks.

Examples of two target applications, a manual control 760 and a safety-related function 770, using the function blocks are shown in FIG. 11. The manual control 760 consist of an analog input function block 762, a manual loader 764, and an analog output function block 768. The safety-related function 770 consists of a plurality of SIS analog inputs ("SISAI") 772, an SIS analog voter ("SISAVTR") 774, and an SIS digital output ("SISDO")778.

Device Descriptions (DD)

As shown in FIG. 12, the function block application processes may also store device descriptions (DD) 860. To extend the network's interoperability, the device descriptions 860 are used in addition to the standard function block parameters. The device descriptions 860 extend the descriptions of each object in the virtual field device.

The device descriptions 860 provide information needed for a control system to interpret the meaning of the data in the virtual field device, including the human interface functions, such as calibration and diagnostics.

The device description can be written in any standardized programming language, such as C, C++, or SmallTalk.

System Management

In operation, function blocks execute in precisely defined intervals and in proper sequence for correct control system operation. System management synchronizes execution of the function blocks and a communication of function block parameters on the bus. System management also handles other important features such as publication of the time of day to all devices, automatic assignment of device addresses, and searching for parameter names or tags on the fieldbus.

The configuration information needed by the system management, such as the system schedule, is described by object descriptions. The configuration information is stored in the network and system management virtual field device 310, as shown in FIG. 7A. The network and system management virtual field device 310 provides access to the system management information base (SMIB) 330, and also to the network management information base (NMIB) 320. The system schedules can be inputted manually or built using a schedule building tool. A schedule building tool is used to generate a function block and link active scheduler schedules are used to generate system and network schedules.

Based on the system schedule, system management controls when the function blocks execute. This insures that each function block executes at the appropriate time in relationship to other function blocks in the system. For a true distributed control system, the activities of the devices and their function blocks also have to be synchronized with those of other devices on the network. The coordination of the execution of blocks in different devices is controlled by a network manager using a network schedule. Network Management is described in detail later.

The system and network schedules contain the start time off-set from the beginning of the absolute link schedule start time. The absolute link schedule start time is known by all devices on the fieldbus.

The system management also has a time publisher which, in a link active scheduler 100, periodically sends application clock synchronization to all field devices. The data link scheduling time is sampled and sent with the application clock message so that the receiving devices can adjust their local application time. Between synchronization messages, the application or system clock time is independently maintained in each field device based on its own system clock. The system clock in each field device initiates the execution of the system schedule for that device, not the data link clock, unless the field device is the link active scheduler 100. System clock synchronization allows the field devices to stamp data throughout a network. If there are backup system clock publishers on the bus, a backup publisher will become the data link clock if the currently active time publisher should fail.

System management also automatically assigns unique network addresses to each field device. Every field device, except a temporary device, should have a unique network address and physical tag. Temporary devices are not assigned tags or permanent addresses. Temporary devices simply join the network at one of four data link visitor addresses reserved for them in the data link layer protocol specification.

The system management function responsible for tag and data link address assignment is referred to as the configuration master. It is normally co-located with the link active scheduler 100, although it is not required to be, so it can monitor the live list for the addition of new devices. When a device is added at a default network address, configuration master verifies that a system management kernel for the field device does not have a physical tag and assigns it one using system management kernel protocol 810. Once assigned, the system management kernel moves to the initialized state. In this state, it is ready to be assigned a network address on the operational network. A system management kernel is described in detail later.

The sequence for assigning a network address to a new field device is as follows: (1) a physical tag is assigned to a new device via configuration device; (2) system management asks the field device for its physical device tag default network address; (3) system management uses the physical device tag to look up the new network address in the configuration table; and (4) system management sends a special set-address message to the device which forces the device to assume the network address. The sequence of these steps is repeated for all devices that enter the network at a default address.

FIG. 12 shows the relationship between system management and the other communication and application components for one embodiment of the present invention. For example, FIG. 12 shows the relationships between the system management and function block application 440, function block objects 850, device descriptions (DD) 860, and object descriptions (OD) 280. System management also uses the fieldbus message specification 230 to remotely access management information within a field device. System management also accesses the communications stack 205 to perform its other functions.

A single system management entity exists in each link master 105/105' or link active scheduler 100. This entity comprises a system management information base 830 (SMIB), an object dictionary 280, and a system management kernel 800.

The system management kernel 800 provides a network coordinated and synchronized set of functions. To enforce the coordination and synchronization of these functions across the network, a manager/agent model is used. In a preferred embodiment, the system management kernel 800 assumes the role of an agent and responds to the instructions received from the system management. A system management protocol is used to define communications between managers and agents.

Information which is used to control system management operation is organized as objects stored in the SMIB 830. The SMIB 830 is accessed by the network through the system and network management virtual field device 310. The SMIB 830 contains configuration and operational parameters for a device. Examples of the objects included in the SMIB 830 are: device identification, physical device tag, list of virtual field devices, time object, schedule object, and configuration status.

The system management allows SMIB objects to be accessed using the fieldbus message specification application services, such as read, write, etc. Access to the SMIB allows remote applications to obtain management information from the device, either before or during network operation. The management virtual field device is shared with the network management agent 880 of the device and thereby also provides access to network management agent objects.

Network Management

FIG. 12 also shows the architectural relationship between network management and the other communication and application components in a device. Each device contains a single network management agent 880 and layer management entities (LME) 875 for its protocols (one for each layer). Each network has at least one network manager which coordinates the network management of the whole system. Network management provides the capabilities of: loading a virtual communication relationship list; configuring the communication stack 205; loading the network schedule; performance monitoring; and fault detection monitoring.

The network manager is responsible for maintaining the operation of the network according to the policies defined for it by the system manager. The network manager enforces the system management policies by monitoring the status of the communication stack 205 in each device, and taking action when necessary. The network manager performs these tasks by processing information and reports produced by network management agents 880, and recommending agents to perform services requested via the fieldbus message specification 230.

The network management agent 880 is responsible for providing the network manager with a fieldbus message specification 230 interface to manage objects of the communication stack 205. Internal to the device, the network management agent 880 maps fieldbus message specification service requests to objects that it maintains for the communication stack 205 as a whole, an objects maintained by the LMEs.

The LMEs 875 provide management capability of a layer protocol, such as the physical layer (PHY) 200, the data link layer (DLL) 210, fieldbus access sublayer (FAS) 220 or fieldbus message specification (FMS) 230 (as shown in FIG. 2). The LMEs 875 provide the network management agent 880 with a local interface to the managed objects of the protocol. All network access to the LMEs and their objects is provided by the network management agent 880.

The NMIB 895 contains the NMIBs 320 in the system and network management virtual field device (VFD) 310. The NMIB also contains objects used to define configuration management, performance management and fault management. The objects are accessed by network managers using fieldbus message specifications services. The objects used for network management objects are designed similar to the function blocks described earlier.

Flexible Function Blocks

For simplicity and illustrative purposes, flexible function blocks ("FFBs") are described by referring mainly to exemplary embodiments. However, it is to be appreciated that FFBs and safety-related FFBs ("SIS-FFBs") may be used in other implementations and designs using other distributed control architectures. Further, it is to be appreciated that that principles discussed herein as applying to FFBs and/or SIS-FFBs may also be applicable to other block-oriented implementations, fieldbus Architectures or other process control systems.

Function Block Framework

With reference to FIGS. 8A and 8B, the open system described above provides a framework for and a detailed description of function blocks 530/530'. With reference to FIG. 11, the open system described above provides a framework for and description of the interconnection of function block inputs and outputs to provide an application solution.

With reference to FIG. 12, described above are device descriptions (DD) 860 which may be utilized to describe the input and output parameters of a function block. The DD 860 provides information needed for a control system to interpret the meaning of the function block data, including the human interface functions, such as calibration and diagnostics. As stated above, the device description can be written in any standardized programming language, such as C, C++, or SmallTalk, or a custom designed device description language.

Flexible Function Block—End User Configured Input/Output and Algorithm/Program

As shown in FIG. 13, one implementation of an SIS-FFB 1350 may include end-user configurable SIS-FFB input(s) 1351, end user configurable SIS-FFB output(s) 1352 and an end user configurable SIS-FFB algorithm (program) 1353. The end-user 1300 creates the SIS-FFB 1350, configuring the input(s) 1351, output(s) 1352 and algorithm 1353 according to the needs of a particular application and according to particular safety requirements. As described above for an SISFB, the SIS-FFB input parameter(s) 1351 define the input(s) that are received by the SIS-FFB 1350 and the SIS-FFB output parameter(s) 1352 define the output (s) that are generated by the SIS-FFB 1350 after the input(s) are processed by an algorithm 1353, as specified by the SIS-FFB 1350. The SIS-FFB Configuration Tool 1301 creates an SIS-FFB device description (DD) 1360 that matches the SIS-FFB 1350 configured by the end-user. The SIS-FFB Configuration Tool 1301 preferably creates the SIS-FFB 1350 by generating data files and code files that define the SIS-FFB 1350 based on the user-configured input(s) 1351, output(s) 1352 and algorithm 1353 and by generating a matching device description. Alternatively, the end-user 1300 (or a programmer) may generate the data and code files that define the SIS-FFB 1350 and the matching device description.

The end-user creates SIS-FFB 1350 and a matching SIS-FFB DD 860 by running SIS-FFB Configuration Tool 1301. SIS-FFB DD 860 enables human interface applications such as operator interface, tuning, calibration and diagnostics to be used with SIS-FFB 1350.

Since the SIS-FFB 1350 operates in a function block framework, the end-user configured SIS-FFB inputs and outputs can be interconnected to solve complex application-specific control problems such as discrete/hybrid/batch and PLC control. Any combination of blocks (standardized and flexible, SIS and non-SIS) may generally be used to solve any particular application problem. It is also apparent that interconnection of standardized and flexible blocks applies to high speed connections, such as HSE, and lesser speed connections. As such FFBs and/or SIS-FFBs are generally communications protocol and configuration independent and may operate on any variety of communications channels.

With reference to FIG. 14, two field devices 620 on a bus 120' controlling a process are illustrated. As shown, there are two applications, Application A and Application B, being run by the two field devices 620. The first application, Application A, is a non-distributed application run by the first of the field devices 620. Application A is built by a combination of interconnected SISFB and SIS-FFBs (e.g., SIS-FFB 1350). The second application, Application B, is a distributed application run by both of the field devices 620. Application B is also built by a combination of interconnected SISFBs and SIS-FFBs (e.g., SIS-FFB 1350). As illustrated by FIG. 14, the SIS-FFB overcomes the limitation of non end-user configurable input/output and non end-user configurable of standardized function blocks. Distributed and non-distributed applications 1360 in field devices 620 on bus 120 can built using any combination of SISFBs and SIS-FFBs 1350. It is to be appreciated that in certain embodiments, significant reductions in plant control system installation, operating and maintenance costs may be achieved using FFBs and/or SIS-FFBs.

FIG. 15 is a block diagram illustrating an example of a complex application built using a combination of standardized function blocks and FFBs. FIG. 15 is an example of multivariable matrix control for a gas processing plant implemented using FFB-MVMC 954. The field devices/components (e.g., PI 1, TI 1, TI 2, TI-3, AI 1, AI 2, FIC 1, FIC 2, LIC 1) shown in FIG. 15 preferably include standard function blocks. It is to be appreciated, while not shown in FIG. 15, that SISFBs and/or SIS-FFBs may be utilized in such an implementation as particular safety related needs may require.

Extended Safety-Related Protocol ("SISRP")

As discussed above, the various embodiments of the present invention utilize an SISRP to authenticate and ensure that communications between SISCs have not been corrupted. In one embodiment, the SISRP utilizes sequence numbers and CKs to validate or authenticate messages.

Publisher-Subscriber Communications

When publisher-subscriber communications are being accomplished, at least one of the various embodiments facilitate secure communications by the process shown in FIG. 16. However, before describing the illustrated embodiment in detail it is to be appreciated that, in general, a CK is associated with each link between SISFBs and/or SIS-FFBs. As discussed above, these CKs are generated by the configuration system and are desirably stored in the resource as part of the publisher-subscriber linkage objects. When data is to be published to a subscriber, desirably the communications include the output parameters (i.e., the data), including value and status information, a sequence number (as described above) and an authenticators (for example, a CRC-32). One embodiment of a process for generating the authenticator is shown in FIG. 16A.

As shown in FIG. 16A, the process for generating an authenticator for one embodiment of the present invention includes obtaining the information utilized to generate the authenticator (Operation 1602). This operation includes identifying the publisher and the subscriber so as to specify the connection over which the data is to be communicated (Operation 1604). This operation also entails obtaining the data (Operation 1606), obtaining the next sequence number used over the identified connection (Operation 1608), obtaining the CK associated with the specified connection (Operation 1610), and obtaining the object index used to identify the parameter in an FBAP to which the data to be communicated pertains (Operation 1612). In one embodiment, the connection key includes four (4) bytes of information, the sequence number includes two (2) bytes, the object index includes two (2) bytes and the data includes anywhere from two (2) to one hundred and twenty (120) bytes of information. Yet, it is to be appreciated that in other embodiments of the present invention, other lengths for data and/or information may be utilized.

Once the desired and necessary information is obtained and suitably stored (e.g., in RAM or otherwise) for use by the processor in the publishing device, the process continues with arranging the obtained information into a desired sequence used to generate a Virtual Protocol Data Unit ("VPDU"), which may be subsequently used to generate the authenticator. As shown in Operation 1614, one sequence that may be utilized to generate a VPDU is shown. It is to be appreciated that other sequences may be utilized, as particular implementations require or specify. Commonly, however, the sequence utilized to arrange the information and generate the VPDU should be standardized so that any SISC (e.g., an SISFB or SIS-FFB) may authenticate data received from or provided to any other SISFB/SIS-FFB. Thus, the sequence shown in FIG. 16 is a preferred, but not mandatory, VPDU sequence. It is to be appreciated that this sequence is "virtual" because it is not communicated over the black channel to the subscribing device/component.

Using the sequence of information generated in Operation 1614, the process continues with generating the authenticator ("GA") (Operation 1616). It is to be appreciated that any of many well known authenticator generation processes may be utilized. Desirably, an authenticator chosen complies with SIL-3 and/or SIL-2 safety requirements. In one embodiment, CRC-32 algorithms are utilized to generate a CRC-32 authenticator. In other embodiments, CRC-64 or other algorithms may be utilized to generate the authenticator.

Referring now to FIG. 16B, the process shown in FIG. 16A continues with generating or assembling the Actual PDU ("APDU"), i.e., the packet of data and information that is to be communicated over the black channel from the publisher to the subscriber (Operation 1618). As shown in FIG. 16B, the APDU is assembled, for one embodiment, in the following sequence: the data 1606, the sequence number 1608 and the authenticator (GA) 1620 (i.e., the result generated in Operation 1616). It is to be appreciated, that other sequences may be utilized in other embodiments of the present invention. However, for purposes of standardized communications on an open fieldbus Architecture or similar architecture, it is desirable for all APDUs to utilize the same packet sequences. The APDU is then communicated over the black channel to the subscriber (Operation 1622).

Upon receiving the APDU, the subscriber suitably extracts and stores the received authenticator ("RA") 1620'. It is to be appreciated that the GA 1620, as well as the data 1606 and/or sequence number 1608 may be corrupted during transmission over the black channel. The subscriber then proceeds with authenticating the received or actual protocol data unit ("APDU") and determines whether the data in the APDU has been corrupted or is otherwise erroneous due to any of the before mentioned safety considerations (e.g., retransmissions, omissions, bit falsifying, masquerading, and the like). In one embodiment of the present invention, APDU authentication proceeds in the subscriber by generating an expected protocol data unit ("EPDU") (Operation 1623). As shown, to generate the EPDU, the subscriber arranges expected information and received data and information into the same sequence as was used in Operation 1614 to generate the VPDU. More specifically, the subscriber obtains, from its memory or otherwise, an expected connection key 1624 and an expected object index 1626. These are combined, as shown, with the received sequence number 1608' and the received data 1606'. In Operation 1628, the subscriber than calculates the expected authenticator value ("EA") using, preferably, the same algorithms (e.g., CRC-32) as were utilized by the publisher (in Operation 1616 to generate the GA (1620).

Referring now to FIG. 16C, in operation 1630, the EA is then compared to the RA.

If the EA is not the same as the RA, then the data was somehow corrupted during transmission over the black channel, was sent erroneously by the publisher, or processed erroneously by the subscriber. The APDU is rejected by the subscriber and processing of the APDU is stopped (Operation 1632). Further, if a successive number of authenticator verifications fails more than a threshold maximum number of times, then the link between the publisher and subscriber is desirably identified as "bad" and future PDUs are not processed using the "bad" publisher-subscriber link until the "bad" condition is resolved.

Referring again to Operation 1630, if the EA is the same as the RA, then the data and information communicated in the APDU is considered to be authenticated. However, since it is possible for data to be sent from a publisher, without corruption over the black channel, in an incorrect sequence, desirably, the process continues with the subscriber verifying that the data received from the publisher is in the expected and correct sequence. This sequence verification is accomplished, for one embodiment of the present invention, by the subscriber obtaining the expected sequence number from its VCR (Operation 1634) and comparing the received sequence number ("RSN") to the expected sequence number ("ESN") (Operation 1636). If the RSN is not equal to the ESN, then processing of the APDU stops (Operation 1632) and the data is discarded. If the sequence numbers are the same, then message/data processing continues using routine non-SIS message processing routines and procedures. Additionally, the subscriber sets a parameter, the last received sequence number ("LRSN") variable, equal to the RSN and desirably resets a "stalecount" parameter to a value of zero.

As mentioned previously, if sequence numbers are incorrect a given number of times (i.e., a "stalecount" exceeds a preset threshold), then the status of the connection between the associated publisher and subscriber is set to "bad" and no future PDUs between the publisher and the subscriber will be accepted until the connection status is reset. In order to recover or restore a "bad" connection between a publisher and a subscriber due to an exceeding of the "stalecount" threshold, for one embodiment of the present invention, the process continues, commonly after a pause and manual or automatic resetting of the link, when a valid authenticator is received. Since the sequence number sent by the publisher, the RSN, and the LRSN in the subscriber are most likely different, the difference between the RSN and the LRSN is calculated. If this difference exceeds the threshold for the stalecount, then the LRSN is set to the RSN, the stalecount is set to zero (0) and the PDU is discarded. The next PDU received is again processed according to the procedures described in FIGS. 16A–C and normal data processing resumes provided the authenticator and sequence numbers are less than the stalecount threshold.

While the operations shown in FIGS. 16A–16C set forth one embodiment for authenticating data communicated over a black channel meets certain safety requirements, it is to be appreciated that the operations, data sequences, authentication algorithms and the like may be changed, added to and/or deleted. For example, in one embodiment, Operations 1630–1636 may be deleted from the processing. Such Operations may be considered to be optional if the RSN utilized to generate the EPDU in Operation 1623 is replaced with an ESN. Using such a process flow, it is anticipated that the EA would not equal the RA if any of the bits in the received information were corrupted or otherwise erroneous. However, such a process flow may not be capable of more precisely identifying which types of errors are occurring over the black channel, for example, whether the error due to sequence number problems, corruption of the actual data received, connection key problems or otherwise. As such it is to be appreciated that various process flows, algorithms, operations, PDUs and the like may be utilized to authenticate data communicated between a publisher and a subscriber over a black channel.

Further, it is to be appreciated that by authenticating data communicated over the black channel for use by safety related components, the various embodiments of the invention described herein may also be utilized to verify the operational status of a black channel for non safety related devices. In particular, if repeated errors occur over a black channel between safety related devices, the probability of errors for non-safety related devices occurring is probably increased. As such, by monitoring the rate and number of authentication failures for safety related communications, one may also indirectly monitor the overall status of the black channel for all communications.

Client-Server Communications

In addition to supporting publisher-subscriber communications, the various embodiments of the present invention also support client-server communications between SISCs. As is commonly appreciated, client-server communications commonly involve read operations and write operations. The various embodiments of the present invention provides processes and devices for implementing safety-related read and write processes.

Read

In general, a read is utilized in at least one embodiment of the present invention to read data utilized in an SIS device (i.e., one with SISCs) is similar, and in certain embodiments identical, to the requests utilized in non-SIS devices (i.e., those without SISCs).

As shown in FIG. 17A, the process by which a component responds to a read request commonly begins with a response by the server (i.e., the component providing the requested information to the requestor/client) of a request to obtain or "read" certain blocks (i.e., output values) provided by the device. Such blocks are commonly identified by an index number or other identifier (Operation 1702). As is commonly appreciated, a device may be capable of outputting many blocks, some of which may be SISCs. As such, the process suitably continues with determining whether the read involves a safety related block (Operation 1704).

If the read does not involve an SISC, then processing desirably continues using standards non-SISRPs (Operation 1706).

Referring again to Operation 1704, if the read involves an SISC, for example, one which includes a safety parameter such as SIS_Access or the like, then processing continues using the SISRP. As discussed previously with respect to publisher-subscriber communications, the SISRP, in at least one embodiment, provides for the calculation and transmission of an authenticator over a black channel. In client-server communications, which involve SISCs, an authenticator is used in transmitting the desired information. As shown in Operations 1708–1744 (FIGS. 17A–C), the process for generating an authenticator, transmitting the requested read data, and authenticating the transmitted data is substantially the same as that used in transmitting data for publisher-subscriber communications. However, an optional and additional sub-index 1717 may be included in the information utilized to generate and verify the authenticator. Further, if the received sequence number is not equal to the expected sequence number, then for at least one embodiment of the present invention, then the PDU is discarded.

Write

When write processes are desired for SISCs, desirably the SISRP, as discussed above, is utilized. To ensure that the receiver of the "write" data and information first verifies the received data and information, the SISRP includes an authenticator and sequence number in any communications. This process is accomplished in one embodiment of the present invention by comparing the length of the data to be written (as specified, for example, in the FMS) against the length of the actually received data string. If such data string does not have a valid length, the data string is discarded. If the data strength has a valid length, then the authenticator is validated, preferably using the processes previously discussed above with respect to publisher-subscriber communications. Further, once the authenticator is validated, the write operation then proceeds. However, if the resource block associated with the block receiving the write request (i.e., the server) is not in an OSS state or a Manual state, then desirably the write request is discarded. It is to be appreciated that it is generally undesirable to write to parameters utilized by SISCs when a safety related resource is being utilized.

Additionally, under certain conditions, it may be desirable to write data into an SISLO. Since sequence numbers are not provided for SISLOs, the write to an SISLO suitably proceeds with calculating an authenticator without including a sequence number. Otherwise, processing of "writes" for SISLOs proceeds as discussed hereinabove for SISCs.

Additional Safety Features

Authenticator Error Detection

In addition to the use of the SISRP and the other features and functions discussed hereinabove, various embodiments of the present invention may also provide for authenticator error detection. Specifically, components implementing the present invention may be configured to monitor the number of authenticator errors that are generated over a period of time. For components used in SIL-3 applications, desirably an error rate greater than one (1) in every 140 minutes results in the component being configured in a fail-safe state with respect to its output blocks. Similarly, in an SIL-2 application, a threshold of one (1) error in every fourteen (14) minutes results in configuring the component in fail-safe state. Last, for SIL-1 applications, the error threshold is desirably one (1) every 1.4 minutes. Other error rates may be utilized for other safety implementations, as desired.

Diagnostics Transducer Block

Various embodiments of the present invention may also be configured to include one or more diagnostic transducer blocks, when implement in a function block fieldbus Architecture or similar architecture. However, commonly only one diagnostic transducer block exists per SIS device. The diagnostic transducer block generally includes a timer and set of counter tracks which monitor all communications to/from the device (i.e., VCRs) for errors. Counters may include those for: bad authenticators, the time at which the last bad authenticator was received, the number of bad sequence numbers, the time at which the last bad sequence number was received, and the time since the last error was communicated through the black channel.

Black Channel Integrity Monitor

Various embodiments of the present invention may also include a black channel integrity monitor. This monitor verifies that the rate of undetected errors (i.e., errors which are not detected by black channel monitoring devices but are detected due to bad sequence numbers or invalid authenticators) from the black channel does not exceed a given limit (either predetermine or set real-time). If the number of errors exceed the threshold, desirably, this monitor terminates black channel connections on which the errors are arising. Desirably, such connections are reinitiated upon operator intervention, reconnects and restarts. However, various embodiments of the present invention may provide for automated or semi-automate reconnects and restarts as particular implementations desire.

Queuing Delay Monitoring and Detection

Additionally, certain embodiments of the present invention may also include a sequence number monitoring feature. Desirably, for a publisher-subscriber connection, a message is published with each macro-cycle. To aid in the detection of the queuing delays, at the start of the publisher-subscriber connection, the publisher communicates a sequence number to the subscriber for the connection. Then the subscriber increments the sequence number locally with each macro-cycle and compares it to the received sequence number, if the difference exceeds the max tolerable variance, then fail-safe or other appropriate actions may be triggered by the subscriber or otherwise.

As discussed hereinabove, the various embodiments of the present invention provide for systems and processes for communicating data amongst SIS devices providing one or more SISC using a fieldbus Architecture and similar architectures and systems. While the present invention has been discussed with reference to certain architectures, functional blocks, processes, data structures and the like it is to be appreciated that the present invention is not so limited and is to be construed in accordance with the spirit and scope of the present invention, as set forth hereinabove, and/or as presently claimed herein or claimed at a later time.

We claim:

1. An apparatus for operating in a block-oriented safety related open control system comprising:
   a memory, which includes at least one safety related component;
   a processor, operably connected to the memory, wherein the processor executes the safety related component based on a system schedule;
   a medium attachment unit, which translates input messages and output messages between the processor and a transmission medium using an extended safety-related protocol; and
   wherein the processor manages the system schedule, instructs a second apparatus when it can execute a second safety related component, and passes a token to the second apparatus when a time arises for executing the second safety related component.

2. The apparatus of claim 1, wherein the apparatus is operably connected to a high speed Ethernet bus.

3. The apparatus of claim 1, wherein the memory includes at least one non-safety related component.

4. A process for communicating safety related data obtained by a first device to a second device comprising:
   obtaining, using a first device, information useful ingenerating a first data sequence;
   generating the first data sequence using the obtained information;
   generating a first authenticator for the first data sequence;
   combining the first data sequence and the first authenticator; and
   communicating the combination to the second device.

5. The process of claim 4, wherein the first device is a publisher and the second device is a subscriber in a publisher-subscriber communications architecture.

6. The process of claim 4, wherein the first device is a client and the second device is a server in a client-server communications architecture.

7. A process for authenticating a received message, wherein the received message includes information pertaining to a safety related component, comprising:
   receiving a first data sequence;
   receiving a first authenticator related to the first data sequence;
   generating a second data sequence based upon the first data sequence;
   calculating a second authenticator based upon the second data sequence;
   comparing the first authenticator and the second authenticator;
   when the first authenticator and the second authenticator are not the same, rejecting the received message; and
   when the first authenticator and the second authenticator are the same,
     receiving a sequence number related to the first data sequence;
     obtaining an expected sequence number; and
     comparing the received sequence number to the expected sequence number;
     when the received sequence number and the expected sequence number are not the same, rejecting the message; and
     when the received sequence number and the expected sequence number are the same, accepting the message.

8. The process of claim 7, wherein the process is used to authenticate a message communicated to a safety related component in a block-oriented safety related open control system.

9. The process of claim 7, wherein the process is executed by a client in a client-server architecture.

10. The process of claim 9, wherein the process comprises communicating a request to read a parameter related to a safety related component to a server and the first data sequence contains a response, communicated by the server, to the request.

11. The process of claim 7, wherein the process is executed by a subscriber in a publisher-subscriber architecture.

12. The process of claim 7, wherein the first data sequence includes data relating to a safety related component used by a device in an open control system.

13. The process of claim 12, wherein the open control system utilizes a fieldbus architecture.

14. The process of claim 12, wherein the first data sequence further includes at least one of a sequence number, an object index and a connection key.

15. The process of claim 12, wherein the first data sequence further includes at least one of a sequence number, an object index and a connection key.

16. The process of claim 7, wherein the first data sequence includes the first authenticator.

17. The process of claim 7, wherein the first data sequence includes the sequence number.

18. The process of claim 7, wherein the first data sequence includes at least one of an object index and a connection key.

19. The process of claim 7, wherein the second data sequence comprises an expected connection key, a received sequence number, and an expected object index, wherein the received sequence number is received in the first data sequence.

20. The process of claim 14, wherein the first data sequence comprises a sub-index.

* * * * *